(12) United States Patent
Fang et al.

(10) Patent No.: US 12,301,092 B2
(45) Date of Patent: *May 13, 2025

(54) SYSTEMS AND METHODS FOR RESISTANCE ADJUSTMENT RELATED TO SWITCH-MODE POWER CONVERTERS

(71) Applicant: ON-BRIGHT ELECTRONICS (SHANGHAI) CO., LTD., Shanghai (CN)

(72) Inventors: Qian Fang, Shanghai (CN); Yaozhang Chen, Shanghai (CN); Liqiang Zhu, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,900

(22) Filed: May 1, 2024

(65) Prior Publication Data

US 2024/0421687 A1    Dec. 19, 2024

Related U.S. Application Data

(63) Continuation of application No. 17/839,972, filed on Jun. 14, 2022, now Pat. No. 12,027,960.

(30) Foreign Application Priority Data

Jun. 29, 2021 (CN) .......................... 202110728122.2

(51) Int. Cl.
*H02M 1/00* (2007.01)
*H02M 5/293* (2006.01)

(52) U.S. Cl.
CPC ....... *H02M 1/0025* (2021.05); *H02M 1/0022* (2021.05); *H02M 5/2932* (2021.05)

(58) Field of Classification Search
CPC . H02M 1/0025; H02M 1/0022; H02M 5/2932
See application file for complete search history.

(56) References Cited

U.S. PATENT DOCUMENTS

| 9,104,216 B2 | 8/2015 | Tang et al. |
| 12,027,960 B2 | 7/2024 | Fang et al. |

(Continued)

FOREIGN PATENT DOCUMENTS

| CN | 101420212 A | 4/2009 |
| CN | 102201754 B | 3/2014 |

(Continued)

OTHER PUBLICATIONS

China Patent Office, Office Action mailed Jan. 31, 2024, for Application No. 202110728122.2.

(Continued)

*Primary Examiner* — Kyle J Moody
*Assistant Examiner* — Lakaisha Jackson
(74) *Attorney, Agent, or Firm* — Faegre Drinker Biddle & Reath LLP

(57) ABSTRACT

Controller and method for a power converter. For example, a controller for a power converter includes: a feedback detector configured to receive a feedback voltage, sample the feedback voltage, and generate a sampled voltage based at least in part on the feedback voltage, the sampled voltage being associated with one or more fluctuations in magnitude; a resistor selector configured to receive the sampled voltage and generate one or more control signals based at least in part on the one or more fluctuations associated with the sampled voltage; a variable resistor network configured to receive the one or more control signals, determine a network resistance based at least in part on the one or more control signals, and output a compensation voltage based at least in part on the network resistance; and a voltage generator (Continued)

connected to the variable resistor network and configured to receive the compensation voltage.

26 Claims, 9 Drawing Sheets

(56) References Cited

U.S. PATENT DOCUMENTS

| | | | |
|---|---|---|---|
| 2006/0244645 A1 | 11/2006 | Ozalevli et al. | |
| 2014/0266093 A1 | 9/2014 | Isham | |
| 2020/0212811 A1 | 7/2020 | Lin et al. | |
| 2021/0305911 A1* | 9/2021 | Chiang | G05F 3/18 |
| 2022/0416643 A1 | 12/2022 | Fang et al. | |
| 2022/0416681 A1* | 12/2022 | Telefus | H02M 7/217 |

FOREIGN PATENT DOCUMENTS

| | | |
|---|---|---|
| CN | 103986333 A | 8/2014 |
| CN | 106992699 A | 7/2017 |
| TW | 522756 B | 3/2003 |
| TW | 202044316 A | 12/2020 |

OTHER PUBLICATIONS

Taiwan Patent Office, Office Action mailed Sep. 2, 2022, for Application No. 110142444.

\* cited by examiner

SYSTEMS AND METHODS FOR RESISTANCE ADJUSTMENT RELATED TO SWITCH-MODE POWER CONVERTERS

1. CROSS-REFERENCES TO RELATED APPLICATIONS

This application is a continuation of U.S. patent application Ser. No. 17/839,972 filed Jun. 14, 2022, which claims priority to Chinese Patent Application No. 202110728122.2, filed Jun. 29, 2021, both applications being incorporated by reference herein for all purposes.

2. BACKGROUND OF THE INVENTION

Certain embodiments of the present invention are directed to circuits. More particularly, some embodiments of the invention provide systems and methods for changing resistance of a variable resistor network as part of a controller for a power converter. Merely by way of example, some embodiments of the invention have been applied to switch-mode power converters. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often employ various topologies, such as the flyback topology, the buck topology, and/or the boost topology. The switch-mode converters usually use a pulse-width-modulated (PWM) mechanism and/or a pulse-frequency-modulated mechanism. For example, a switch-mode converter includes an electromagnetic interference (EMI) filtering circuit, a rectifier circuit, a power conversion circuit, a pulse-width-modulated (PWM) control circuit, and/or an output filter circuit. As an example, the pulse-width-modulated (PWM) control circuit is implemented as a PWM control chip.

FIG. 1 is a simplified diagram showing a conventional switch-mode power converter. As shown in FIG. 1, the switch-mode power converter 100 includes a primary winding 110, a secondary winding 112, and an auxiliary winding 114, which are parts of a transformer (e.g., a transformer T). On the primary side, the power converter 100 includes a bridge rectifier 120 (e.g., a rectifier that includes four diodes), diodes 122, 124 and 126, resistors 130, 132, 134, 180, 190 and 192, capacitors 140, 142, 172, 174 and 176, a transistor 150, and a controller 152 (e.g., a chip). Additionally, on the secondary side, the power converter 100 includes a capacitor 170 and output terminals 194 and 196. In certain examples, the power converter 110 serves as a power supply that provides an output voltage 178. For example, the output voltage 178 is constant in average. In some examples, the controller 152 (e.g., a chip) includes a terminal 144 (e.g., a pin), a terminal 154 (e.g., a pin), a terminal 156 (e.g., a pin), a terminal 158 (e.g., a pin), a terminal 182 (e.g., a pin), and a terminal 184 (e.g., a pin).

As shown in FIG. 1, an alternating current (AC) input voltage 128 (e.g., $V_{AC}$) is rectified by the bridge rectifier 120 and then filtered by the capacitor 140. One terminal of the capacitor 140 is connected to one terminal of the resistor 130, one terminal of the resistor 138, one terminal of the capacitor 172, and one terminal of the primary winding 110. Another terminal of the capacitor 140 is biased to a ground voltage on the primary side. Another terminal of the resistor 138 and another terminal of the capacitor 172 are connected to one terminal of the diode 122. Additionally, another terminal of the primary winding 110 is connected to another terminal of the diode 122 and the drain terminal of the transistor 150.

Another terminal of the resistor 130 is connected to one terminal of the resistor 134, and another terminal of the resistor 134 is connected to one terminal of the capacitor 142, one terminal of the diode 124, and the terminal 154 of the controller 152. Moreover, another terminal of the diode 124 is connected to one terminal of the resistor 190 and one terminal of the auxiliary winding 114. Another terminal of the auxiliary winding 114 is biased to the ground voltage on the primary side. Also, another terminal of the resistor 190 is connected to the terminal 182 of the controller 152 and one terminal of the resistor 192. The terminal 182 of the controller 152 receives a feedback voltage 183. Another terminal of the resistor 192 is biased to the ground voltage on the primary side.

Moreover, the terminal 156 of the controller 152 is connected to the gate terminal of the transistor 150. The controller 152 outputs a drive voltage 148 through the terminal 156 to the gate terminal of the transistor 150. The terminal 158 of the controller 152 is connected to the source terminal of the transistor 150) and is also connected to one terminal of the resistor 132. Another terminal of the resistor 132 and the terminal 144 of the controller 152 both are biased to the ground voltage on the primary side. Also, the terminal 184 of the controller 152 is connected to one terminal of the resistor 180 and one terminal of the capacitor 174. The terminal 184 of the controller 152 is biased at a compensation voltage 185 (e.g., $V_{comp}$). Another terminal of the resistor 180 is connected to one terminal of the capacitor 176. Another terminal of the capacitor 176 and another terminal of the capacitor 174 are biased to the ground voltage on the primary side.

As shown in FIG. 1, one terminal of the secondary winding 112 is connected to one terminal of the diode 126, and another terminal of the diode 126 is connected to one terminal of the capacitor 170 and the output terminal 194. Another terminal of the secondary winding 112 is connected to another terminal of the capacitor 170 and the output terminal 196. The output terminal 196 is biased to a ground voltage on the secondary side. The output terminals 194 and 196 provide the output voltage 178 (e.g., $V_{out}$) to a load of the power converter 100.

Additionally, the terminal 182 of the controller 152 receives the feedback voltage 183 from a voltage divider that includes the resistors 190 and 192. One terminal of the resistor 190 receives a voltage from the auxiliary winding 114 of the transformer (e.g., a transformer T), and the feedback voltage 183 is used to represent the output voltage 178. For example, during a demagnetization process when the transistor 150 is turned off, the feedback voltage 183 (e.g., $V_{FB}$) changes linearly with the output voltage 178 (e.g., $V_{out}$).

FIG. 2 is a simplified diagram showing the conventional controller 152 as part of the switch-mode power converter 100 as shown in FIG. 1. The controller 152 includes a feedback detector 222, a transconductance amplifier 224, a comparator 226, an oscillator 228, a demagnetization detector 230, and a drive signal generator 232.

The feedback detector 222 receives the feedback voltage 183 (e.g., $V_{FB}$), samples the received feedback voltage 183, and generates a sampled voltage 223 (e.g., $V_{FB\_S}$). The sampled voltage 223 (e.g., $V_{FB\_S}$) is received by the transconductance amplifier 224, which also receives a reference voltage 225 (e.g., $V_{ref}$). Based at least in part on the sampled voltage 223 (e.g., $V_{FB\_S}$) and the reference voltage 225 (e.g., $V_{ref}$), the transconductance amplifier 224 generates a current that generates the compensation voltage 185 (e.g., $V_{comp}$) with a compensation network, which includes the capacitors 174 and 176 and the resistor 180. The compensation voltage 185 is received by the comparator 226, which also receives a ramp voltage 229 from the oscillator 228. The oscillator 228 receives a supply voltage for the controller 152 (e.g., a chip) and generates the ramp voltage 229. Based at least in part on the compensation voltage 185 (e.g., $V_{comp}$) and the ramp voltage 229 (e.g., $V_{ramp}$), the comparator 226 generates a logic signal 227. If the ramp voltage 229 is larger than the compensation voltage 185, the logic signal 227 is at a logic high level, and if the ramp voltage 229 is smaller than the compensation voltage 185, the logic signal 227 is at a logic low level.

The feedback voltage 183 is also received by the demagnetization detector 230, which generates a logic signal 231 based at least in part on the feedback voltage 183. If the feedback voltage 183 indicates that the demagnetization process of the transformer (e.g., a transformer T) has ended, the logic signal 231 is at a logic high level, and if the feedback voltage 183 does not indicate that the demagnetization process of the transformer (e.g., a transformer T) has ended, the logic signal 231 is at a logic low level. If the feedback voltage 183 indicates the end of the demagnetization process of the transformer (e.g., a transformer T), the logic signal 231 changes from the logic low level to the logic high level.

The drive signal generator 232 receives the logic signal 227 from the comparator 226 and receives the logic signal 231 from the demagnetization detector 230. Based at least in part on the logic signals 227 and 231, the drive signal generator 232 generates the drive voltage 148. If the logic signal 231 (e.g., the "on" signal) changes from the logic low level to the logic high level, the drive signal generator 232 generates the drive voltage 148 (e.g., $V_{gate}$) to change the transistor 150 from being turned off to being turned on. Also, if the logic signal 227 (e.g., the "off" signal) changes from the logic low level to the logic high level, the drive signal generator 232 generates the drive voltage 148 (e.g., $V_{gate}$) to change the transistor 150 from being turned on to being turned off.

Hence it is highly desirable to improve the techniques related to switch-mode power converters.

3. BRIEF SUMMARY OF THE INVENTION

Certain embodiments of the present invention are directed to circuits. More particularly, some embodiments of the invention provide systems and methods for changing resistance of a variable resistor network as part of a controller for a power converter. Merely by way of example, some embodiments of the invention have been applied to switch-mode power converters. But it would be recognized that the invention has a much broader range of applicability.

According to certain embodiments, a controller for a power converter includes: a feedback detector configured to receive a feedback voltage, sample the feedback voltage, and generate a sampled voltage based at least in part on the feedback voltage, the sampled voltage being associated with one or more fluctuations in magnitude; a resistor selector configured to receive the sampled voltage and generate one or more control signals based at least in part on the one or more fluctuations associated with the sampled voltage; a variable resistor network configured to receive the one or more control signals, determine a network resistance based at least in part on the one or more control signals, and output a compensation voltage based at least in part on the network resistance; and a voltage generator connected to the variable resistor network and configured to receive the compensation voltage and generate a drive voltage based at least in part on the compensation voltage.

According to some embodiments, a controller for a power converter includes: a feedback detector configured to receive a feedback voltage, sample the feedback voltage, and generate a sampled voltage based at least in part on the feedback voltage, the sampled voltage being associated with one or more fluctuations in magnitude; a resistor selector configured to receive the sampled voltage and generate one or more control signals based at least in part on the one or more fluctuations associated with the sampled voltage; a variable resistor network configured to receive the one or more control signals, determine a network resistance based at least in part on the one or more control signals, and output a first voltage based at least in part on the network resistance; a low-pass filter configured to receive the sampled voltage and output a second voltage based at least in part on the sampled voltage; an adder configured to receive the first voltage and the second voltage and generate a compensation voltage based at least in part on the first voltage and the second voltage; and a voltage generator connected to the adder and configured to receive the compensation voltage and generate a drive voltage based at least in part on the compensation voltage.

According to certain embodiments, a method for a power converter includes: receiving a feedback voltage; sampling the feedback voltage; generating a sampled voltage based at least in part on the feedback voltage, the sampled voltage being associated with one or more fluctuations in magnitude; receiving the sampled voltage; generating one or more control signals based at least in part on the one or more fluctuations associated with the sampled voltage; receiving the one or more control signals; determining a network resistance based at least in part on the one or more control signals; outputting a compensation voltage based at least in part on the network resistance; receiving the compensation voltage; and generating a drive voltage based at least in part on the compensation voltage.

According to some embodiments, a method for a power converter includes: receiving a feedback voltage; sampling the feedback voltage; generating a sampled voltage based at least in part on the feedback voltage, the sampled voltage being associated with one or more fluctuations in magnitude; receiving the sampled voltage; generating one or more control signals based at least in part on the one or more fluctuations associated with the sampled voltage; receiving the one or more control signals; determining a network resistance based at least in part on the one or more control signals; outputting a first voltage based at least in part on the network resistance; outputting a second voltage based at least in part on the sampled voltage; receiving the first voltage and the second voltage; generating a compensation voltage based at least in part on the first voltage and the second voltage; receiving the compensation voltage; and generating a drive voltage based at least in part on the compensation voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for changing resistance of a variable resistor network as part of a controller for a power converter. Merely by way of example, some embodiments of the invention have been applied to switch-mode power converters. But it would be recognized that the invention has a much broader range of applicability.

Figure 1:
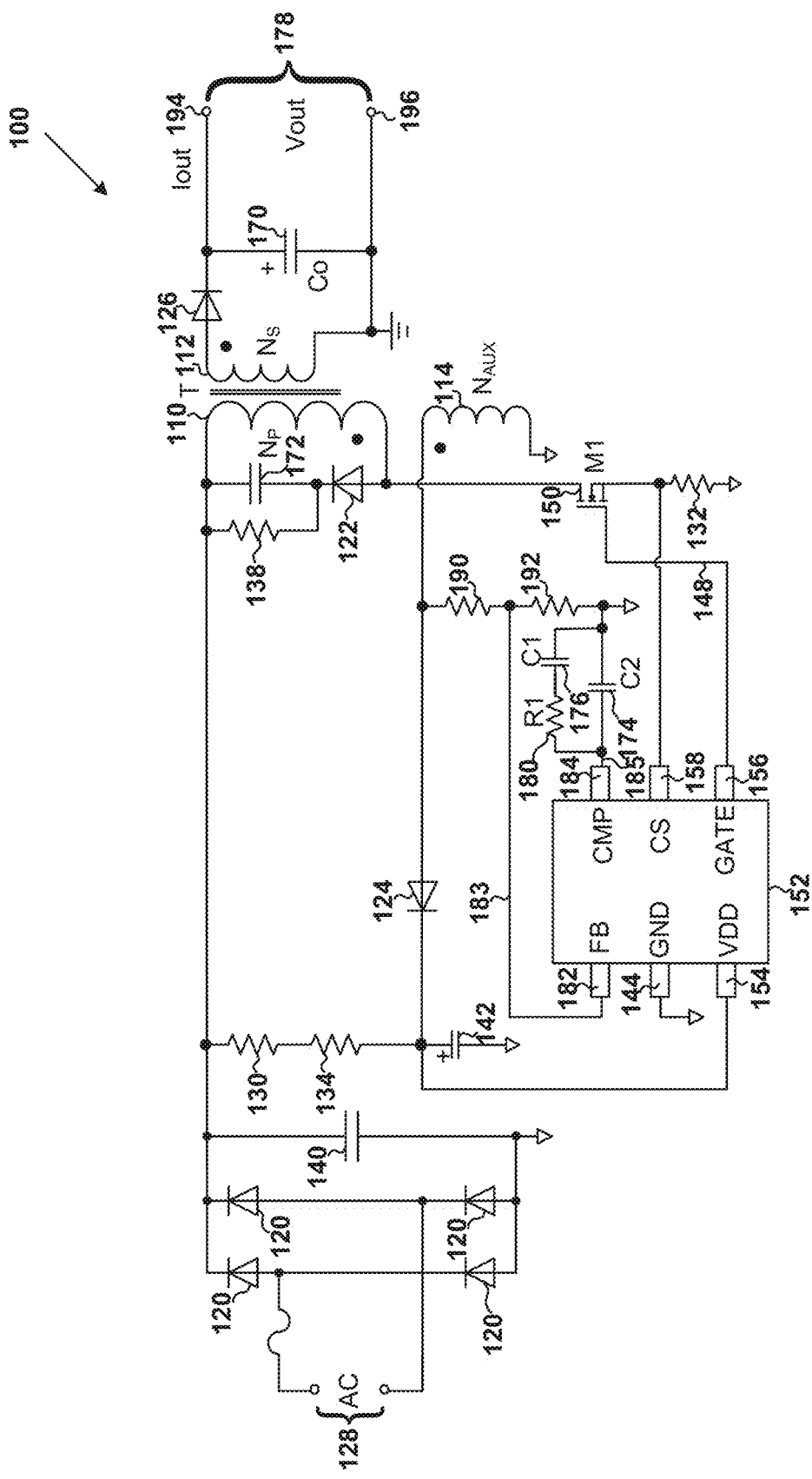
FIG. 1 is a simplified diagram showing a conventional switch-mode power converter.
Figure 2:
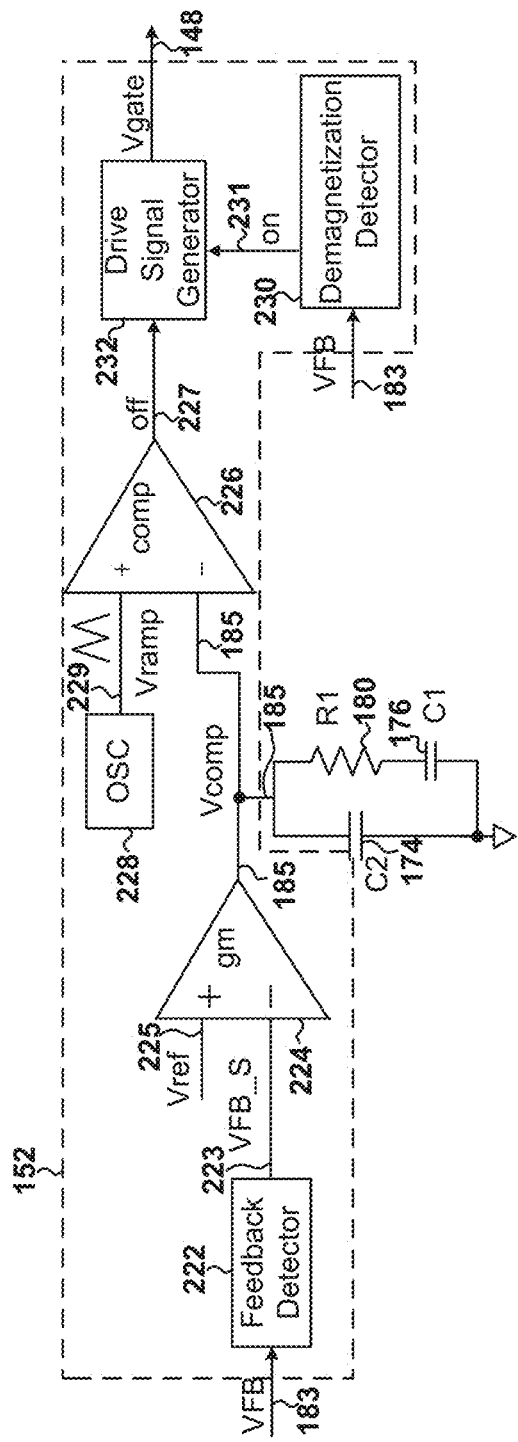
FIG. 2 is a simplified diagram showing the conventional controller as part of the switch-mode power converter as shown in FIG. 1.

As shown in FIG. 1 and FIG. 2, the capacitor 176 and the transconductance amplifier 224 provide a first dominant pole for the power converter 100 according to certain embodiments. For example, the capacitance of the capacitor 176 and the output impedance of the transconductance amplifier 224 are large in magnitude, and the frequency of the dominant pole for the power converter 100 is less than 1 Hz. In some examples, the capacitor 170 and the load of the power converter 100 provide a second dominant pole. For example, if the equivalent resistance of the load becomes larger, an output current provided to the load by the power converter 100 (e.g., by a power supply with the constant output voltage 178 in average) becomes smaller, causing the frequency of the second dominant pole to become lower. As an example, if the frequency of the second dominant pole becomes lower, the frequency of the second dominant pole becomes closer to the frequency of the dominant pole, thus causing the power converter 100 to become less stable. In certain examples, in order to compensate for the second dominant pole, the resistor 180 is used to provide a zero to the power converter 100. For example, if the frequency of the zero becomes closer to the frequency of the second dominant pole, the power converter 100 becomes more stable. As an example, to keep the frequency of the zero close to the frequency of the second dominant pole, if the equivalent resistance of the load increases, the resistance of the resistor 180 also needs to increase, but if the resistance of the resistor 180 becomes excessively large, an input current that is associated with the AC input voltage 128 (e.g., $V_{AC}$) for the power converter 100 becomes distorted.

Figure 3:
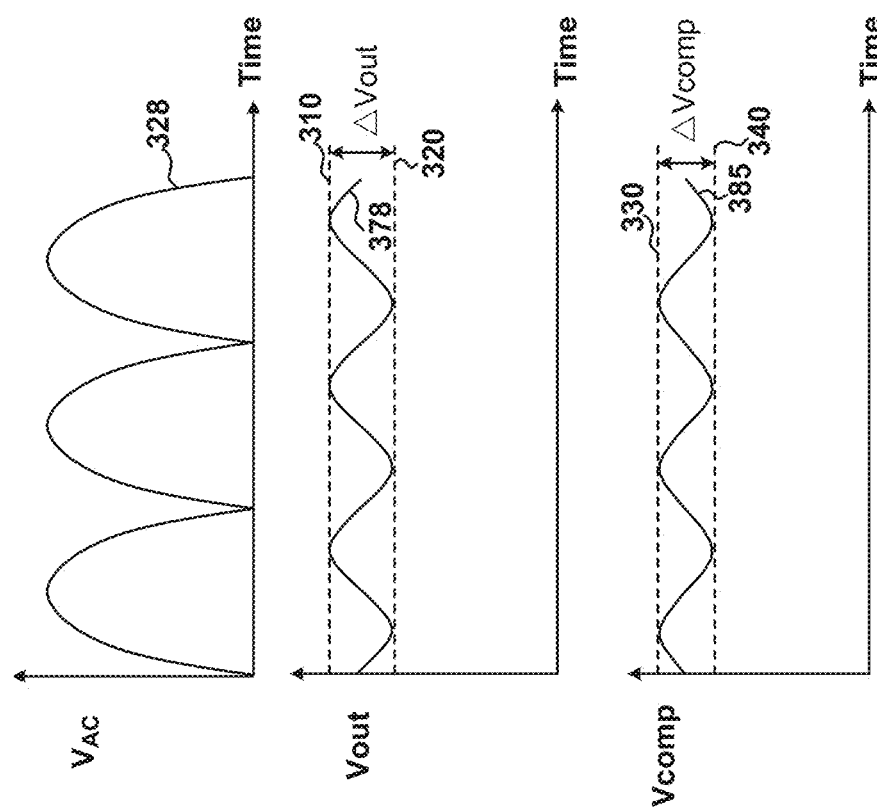
FIG. 3 shows a simplified timing diagram for the conventional switch-mode power converter as shown in FIG. 1 according to some embodiments.

FIG. 3 shows a simplified timing diagram for the conventional switch-mode power converter 100 as shown in FIG. 1 according to some embodiments. The waveform 328 represents the AC input voltage 128 (e.g., $V_{AC}$) as a function of time, the waveform 378 represents the output voltage 178 (e.g., $V_{out}$) as a function of time, and the waveform 385 represents the compensation voltage 185 (e.g., $V_{comp}$) as a function of time.

According to certain embodiments, as shown by the waveform 328, the AC input voltage 128 (e.g., $V_{AC}$) undergoes sinusoidal fluctuations as a function of time. In some examples, as shown by the waveform 378, the output voltage 178 (e.g., $V_{out}$) undergoes fluctuations as a function of time. For example, the output voltage 178 (e.g., $V_{out}$) remains constant in average but fluctuates with time. As an example, the output voltage 178 (e.g., $V_{out}$) fluctuates between a maximum magnitude 310 and a minimum magnitude 320. In certain examples, the amplitude (e.g., $\Delta V_{out}$) of the output voltage 178 is equal to the maximum magnitude 310 minus the minimum magnitude 320. For example, the amplitude (e.g., $\Delta V_{out}$) of the output voltage 178 describes the fluctuations of the output voltage 178.

In some examples, as shown by the waveform 385, the compensation voltage 185 (e.g., $V_{comp}$) undergoes fluctuations as a function of time. For example, the compensation voltage 185 (e.g., $V_{comp}$) remains constant in average but fluctuates with time. As an example, the compensation voltage 185 (e.g., $V_{comp}$) fluctuates between a maximum magnitude 330 and a minimum magnitude 340. In certain examples, the amplitude (e.g., $\Delta V_{comp}$) of the compensation voltage 185 is equal to the maximum magnitude 330 minus the minimum magnitude 340. For example, the amplitude (e.g., $\Delta V_{comp}$) of the compensation voltage 185 describes the fluctuations of the compensation voltage 185.

According to some embodiments, as shown in FIG. 2, the sampled voltage 223 (e.g., $V_{FB\_S}$) undergoes fluctuations that are directly proportional to the fluctuations of the output voltage 178 (e.g., $V_{out}$). For example, if the amplitude (e.g., $\Delta V_{out}$) of the output voltage 178 becomes larger, the amplitude of the sampled voltage 223 (e.g., $V_{FB\_S}$) also becomes larger. As an example, if the amplitude (e.g., $\Delta V_{out}$) of the output voltage 178 (e.g., $V_{out}$) becomes smaller, the amplitude of the sampled voltage 223 (e.g., $V_{FB\_S}$) also becomes smaller.

In some embodiments, as shown in FIG. 2, the compensation voltage 185 (e.g., $V_{comp}$) is equal to the sum of the voltage across the resistor 180 and the voltage across the capacitor 176. For example, if the capacitance of the capacitor 176 is large, the voltage across the capacitor 176 approximates a DC voltage when the power converter 100 is in a steady state. As an example, the voltage across the resistor 180 is determined as follows:

$$V_{180} = (V_{ref} - V_{FB\_S}) \times g_m \times R_1 \quad \text{(Equation 1)}$$

where $V_{180}$ represents the voltage across the resistor 180. Additionally, $V_{ref}$ represents the reference voltage 225, and $V_{FB\_S}$ represents the sampled voltage 223. Moreover, $g_m$ represents the transconductance of the transconductance amplifier 224, and $R_1$ represents the resistance of the resistor 180.

In certain embodiments, the voltage across the resistor 180 undergoes fluctuations in directions that are opposite to the fluctuations of the sampled voltage 223. For example, if the amplitude (e.g., $\Delta V_{out}$) of the output voltage 178 becomes larger, the amplitude of the voltage across the resistor 180 also becomes larger, causing the amplitude (e.g., $\Delta V_{comp}$) of the compensation voltage 185 to become larger. As an example, if the amplitude (e.g., $\Delta V_{out}$) of the output voltage 178 becomes larger, the amplitude of the voltage across the resistor 180 also becomes larger, causing the distortion of the input current that is associated with the AC input voltage 128 (e.g., $V_{AC}$) for the power converter 100 becomes more serious.

As shown in FIG. 1, the capacitor 174 is used to filter out the fluctuations in the voltage across the resistor 180 according to some embodiments. For example, the capacitor 174 and the resistor 180 provide a third pole, so in order to prevent the third pole from canceling the effect of the zero provided by at least the resistor 180, the capacitance of the capacitor 174 is smaller than the capacitance of the capacitor 176. As an example, if the capacitance of the capacitor 174 is smaller than the capacitance of the capacitor 176, the capacitor 174 cannot effectively filter out the fluctuations in the voltage across the resistor 180, so the resistance of the resistor 180 needs to be limited in magnitude. In some examples, if the resistance of the resistor 180 is limited in magnitude, when the equivalent resistance of the load is large (e.g., when the output current provided to the load by the power converter 100 with the constant output voltage 178 is small), the power converter 100 suffers from slow responsiveness and insufficient stability.

For example, if the output voltage 178 remains constant in average, when the output current becomes larger, the fluctuations of the output voltage 178 also become larger. As an example, if the output voltage 178 remains constant in average, when the output current becomes smaller, the fluctuations of the output voltage 178 also become smaller.

According to certain embodiments, in order to improve the responsiveness and stability of the power converter 100 when the output current provided to the load is small, the power converter 100 as shown in FIG. 1 needs to be modified. In certain examples, the resistor 180 needs to be modified so that the resistance of the resistor 180 changes with the output current. For example, if the output current of the power converter 100 becomes larger, the resistor 180 needs to be modified so that the resistance of the resistor 180 becomes smaller. As an example, if the output current of the power converter 100 becomes smaller, the resistor 180 needs to be modified so that the resistance of the resistor 180 becomes larger.

In some examples, the resistor 180 needs to be modified so that the resistance of the resistor 180 changes with the amplitude (e.g., $\Delta V_{out}$) of the output voltage 178. For example, if the amplitude (e.g., $\Delta V_{out}$) of the output voltage 178 becomes larger, the resistor 180 needs to be modified so that the resistance of the resistor 180 becomes smaller. As an example, if the amplitude (e.g., $\Delta V_{out}$) of the output voltage 178 becomes smaller, the resistor 180 needs to be modified so that the resistance of the resistor 180 becomes larger.

In certain examples, the resistor 180 needs to be modified so that the resistance of the resistor 180 changes with the amplitude (e.g., $\Delta V_{out}$) of the output voltage 178. For example, if the amplitude of the sampled voltage 223 (e.g., $V_{FB\_S}$) becomes larger, the resistor 180 needs to be modified so that the resistance of the resistor 180 becomes smaller. As an example, if the amplitude of the sampled voltage 223 (e.g., $V_{FB\_S}$) becomes smaller, the resistor 180 needs to be modified so that the resistance of the resistor 180 becomes larger.

Figure 4:
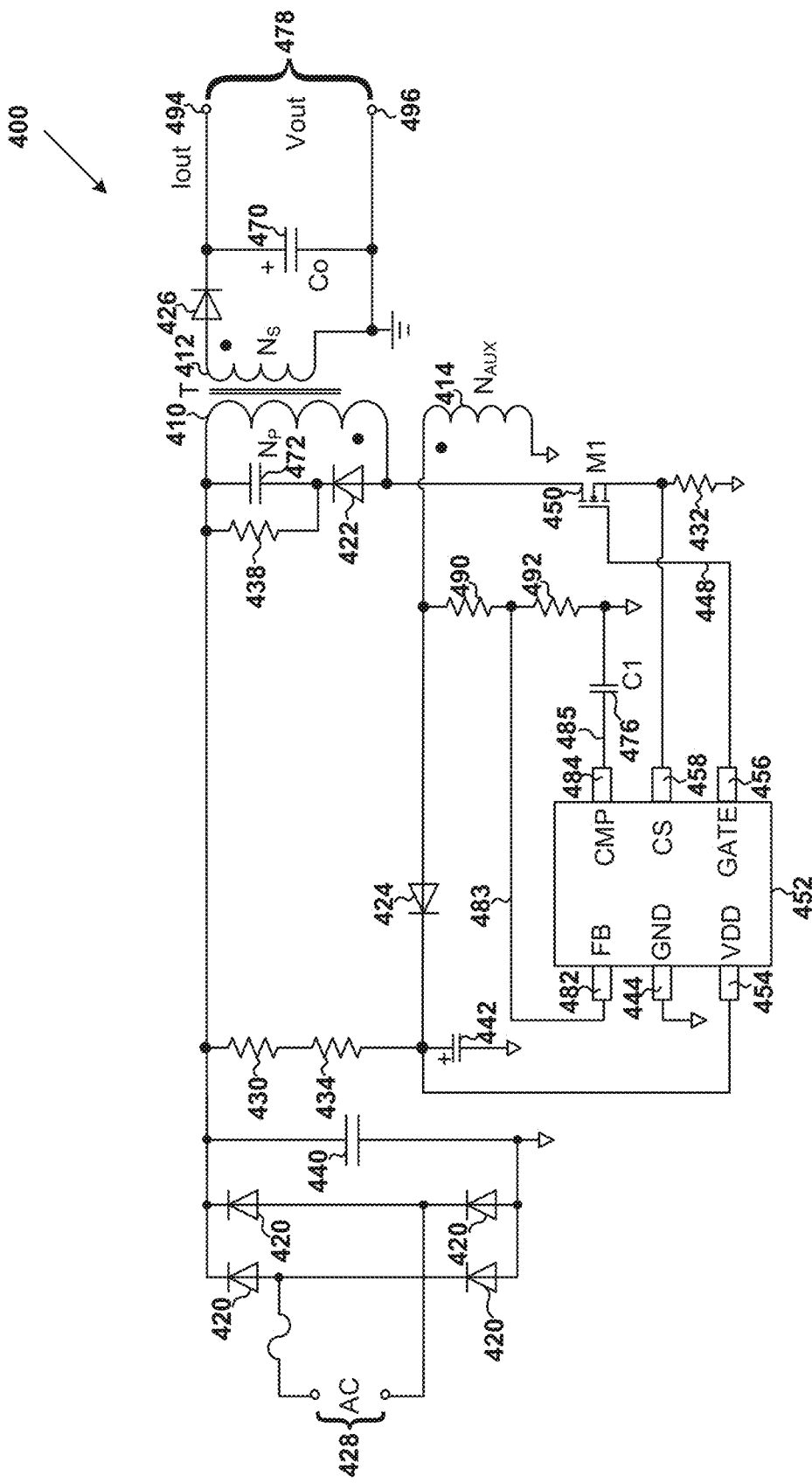
FIG. 4 is a simplified diagram showing a switch-mode power converter according to some embodiments of the present invention.

FIG. 4 is a simplified diagram showing a switch-mode power converter according to some embodiments of the present invention. This diagram is merely an example, which should not unduly limit the scope of the claims. One of ordinary skill in the art would recognize many variations, alternatives, and modifications. As shown in FIG. 4, the switch-mode power converter 400 includes a primary winding 410, a secondary winding 412, and an auxiliary winding 414, which are parts of a transformer (e.g., a transformer T). On the primary side, the power converter 400 includes a bridge rectifier 420 (e.g., a rectifier that includes four diodes), diodes 422, 424 and 426, resistors 430, 432, 434, 490 and 492, capacitors 440, 442, 472 and 476, a transistor 450, and a controller 452 (e.g., a chip). Additionally, on the secondary side, the power converter 400 includes a capacitor 470 and output terminals 494 and 496. In certain examples, the power converter 400 serves as a power supply that provides an output voltage 478. For example, the output voltage 478 is constant in average. In some examples, the controller 452 (e.g., a chip) includes a terminal 444 (e.g., a pin), a terminal 454 (e.g., a pin), a terminal 456 (e.g., a pin), a terminal 458 (e.g., a pin), a terminal 482 (e.g., a pin), and a terminal 484 (e.g., a pin). For example, the controller 452 (e.g., a chip) is implemented according to FIG. 5. Although the above has been shown using a selected group of components for the power converter 400, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 4, an alternating current (AC) input voltage 428 (e.g., $V_{AC}$) is rectified by the bridge rectifier 420 and then filtered by the capacitor 440 according to certain embodiments. For example, one terminal of the capacitor 440 is connected to one terminal of the resistor 430, one terminal of the resistor 438, one terminal of the capacitor 472, and one terminal of the primary winding 410. As an example, another terminal of the capacitor 440 is biased to a ground voltage on the primary side. For example, another terminal of the resistor 438 and another terminal of the capacitor 472 are connected to one terminal of the diode 422. As an example, another terminal of the primary winding 410 is connected to another terminal of the diode 422 and the drain terminal of the transistor 450.

In some embodiments, another terminal of the resistor 430 is connected to one terminal of the resistor 434, and another terminal of the resistor 434 is connected to one terminal of the capacitor 442, one terminal of the diode 424, and the terminal 454 of the controller 452. For example, another terminal of the diode 424 is connected to one terminal of the resistor 490 and one terminal of the auxiliary winding 414. As an example, another terminal of the auxiliary winding 414 is biased to the ground voltage on the primary side. For example, another terminal of the resistor 490 is connected to the terminal 482 of the controller 452 and one terminal of the resistor 492. As an example, the terminal 482 of the controller 452 receives a feedback voltage 483. For example, another terminal of the resistor 492 is biased to the ground voltage on the primary side.

In certain embodiments, the terminal 456 of the controller 452 is connected to the gate terminal of the transistor 450. For example, the controller 452 outputs a drive voltage 448 through the terminal 456 to the gate terminal of the transistor 450. As an example, the terminal 458 of the controller 452 is connected to the source terminal of the transistor 450) and is also connected to one terminal of the resistor 432. For example, another terminal of the resistor 432 and the terminal 444 of the controller 452 both are biased to the ground voltage on the primary side. As an example, the terminal 484 of the controller 452 is connected to one terminal of the capacitor 476. For example, the terminal 484 of the controller 452 is biased at a capacitor voltage 485. As an example, another terminal of the capacitor 476 is biased to the ground voltage on the primary side.

As shown in FIG. 4, one terminal of the secondary winding 412 is connected to one terminal of the diode 426, and another terminal of the diode 426 is connected to one terminal of the capacitor 470) and the output terminal 494 according to some embodiments. For example, another terminal of the secondary winding 412 is connected to another terminal of the capacitor 470 and the output terminal 496. As an example, the output terminal 496 is biased to a ground voltage on the secondary side. For example, the output terminals 494 and 496 provide the output voltage 478 (e.g., $V_{out}$) to a load of the power converter 400.

According to certain embodiments, the terminal 482 of the controller 452 receives the feedback voltage 483 from a voltage divider that includes the resistors 490 and 492. For example, one terminal of the resistor 490 receives a voltage from the auxiliary winding 414 of the transformer (e.g., a transformer T), and the feedback voltage 483 is used to represent the output voltage 478. As an example, during a demagnetization process when the transistor 450 is turned off, the feedback voltage 483 (e.g., $V_{FB}$) changes linearly with the output voltage 478 (e.g., $V_{out}$).

Figure 5:
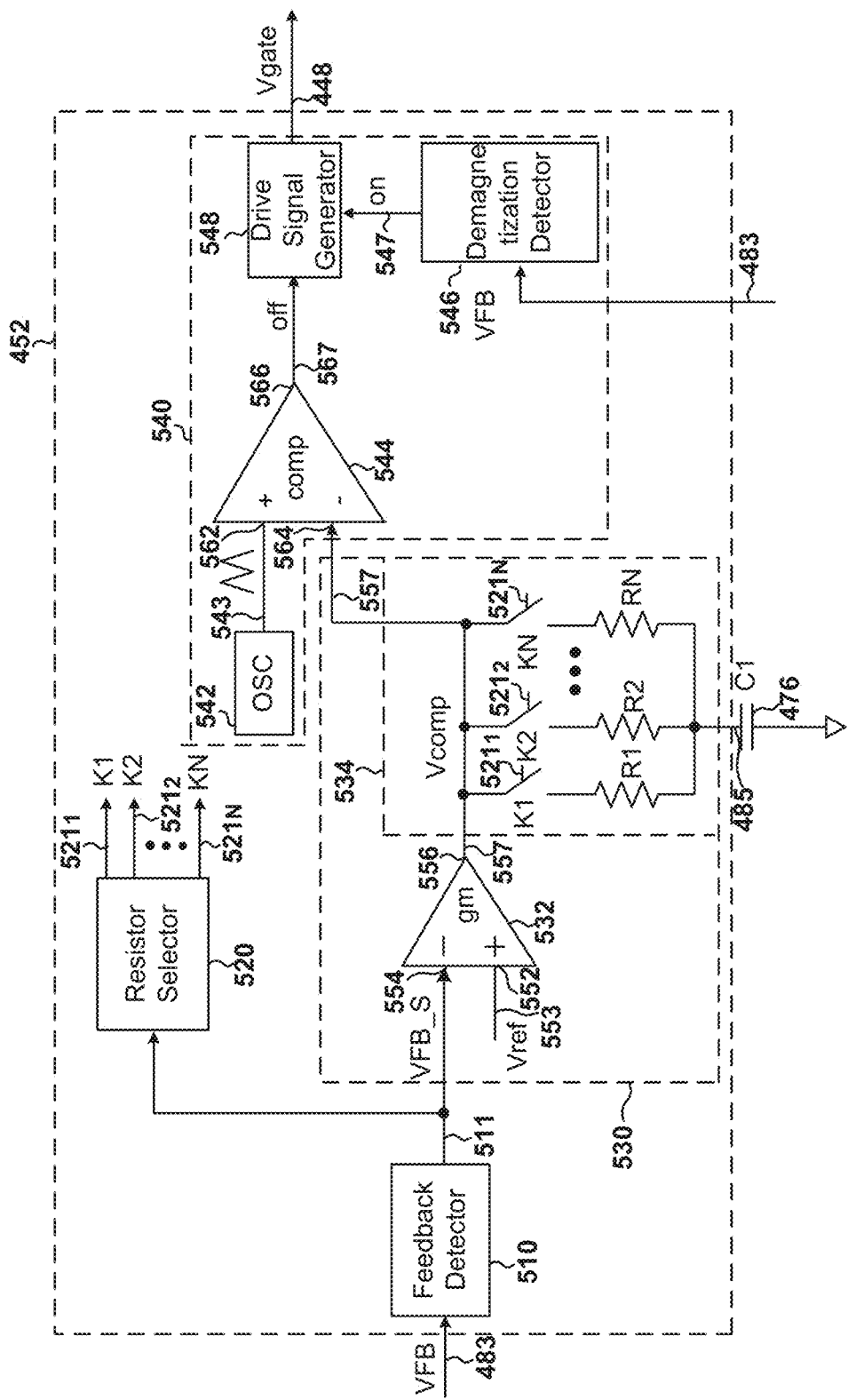
FIG. 5 is a simplified diagram showing the controller as part of the switch-mode power converter as shown in FIG. 4 according to certain embodiments of the present invention.

In some embodiments, the controller 452 (e.g., a chip) is implemented according to FIG. 5. For example, the terminal 482 of the controller 452 receives the feedback voltage 483, and the terminal 484 of the controller 452 is biased at the capacitor voltage 485. As an example, the terminal 456 of the controller 452 outputs the drive voltage 448.

FIG. 5 is a simplified diagram showing the controller 452 as part of the switch-mode power converter 400 as shown in FIG. 4 according to certain embodiments of the present invention. This diagram is merely an example, which should not unduly limit the scope of the claims. One of ordinary skill in the art would recognize many variations, alternatives, and modifications. The controller 452 includes a feedback detector 510, a resistor selector 520, a transconductance amplifier 532, a variable resistor network 534, an oscillator 542, a comparator 544, a demagnetization detector 546, and a drive signal generator 548. For example, the transconductance amplifier 532 and the variable resistor network 534 are parts of a compensation voltage generator 530. As an example, the oscillator 542, the comparator 544, the demagnetization detector 546, and the drive signal generator 548 are parts of a voltage generator 540). Although the above has been shown using a selected group of components for the controller 452, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the feedback detector 510 receives the feedback voltage 483 (e.g., $V_{FB}$), samples the received feedback voltage 483, and generates a sampled voltage 511 (e.g., $V_{FB\_S}$). For example, the sampled voltage 511 (e.g., $V_{FB\_S}$) is received by an input terminal 554 (e.g., the "−" terminal) of the transconductance amplifier 532, which also includes an input terminal 552 (e.g., the "+" terminal) and an output terminal 556. As an example, the input terminal 552 (e.g., the "+" terminal) of the transconductance amplifier 532 receives a reference voltage 553 (e.g., $V_{ref}$).

In certain examples, based at least in part on the sampled voltage 511 (e.g., $V_{FB\_S}$) and the reference voltage 553 (e.g., $V_{ref}$), the transconductance amplifier 532 generates a current that generates a compensation voltage 557 (e.g., $V_{comp}$) with a compensation network, which includes the variable resistor network 534 and the capacitor 476. For example, the variable resistor network 534 is connected to the capacitor 476 through the terminal 484. As an example, the output terminal 556 of the transconductance amplifier 532 is biased at the compensation voltage 557 (e.g., $V_{comp}$). For example, the variable resistor network 534 outputs the compensation voltage 557 (e.g., $V_{comp}$) to an input terminal 564 (e.g., the "−" terminal) of the comparator 544. In some examples, the variable resistor network 534 has a network resistance that can be changed by control signals $521_1$, $521_2$, . . . , $521_n$, . . . , and $521_N$, wherein N is an integer larger than 1. For example, the compensation voltage 557 (e.g., $V_{comp}$) is generated based at least in part on the network resistance of the variable resistor network 534. As an example, if the network resistance of the variable resistor network 534 is changed by the control signals $521_1$, $521_2$, . . . , $521_n$, . . . , and $521_N$, the compensation voltage 557 (e.g., $V_{comp}$) also changes.

In some embodiments, the compensation voltage 557 is received by the input terminal 564 (e.g., the "−" terminal) of the comparator 544, which also includes an input terminal 562 (e.g., the "+" terminal) and an output terminal 566. For example, the input terminal 562 (e.g., the "−" terminal) of the comparator 544 receives a ramp voltage 543 from the oscillator 542. As an example, the oscillator 542 receives a supply voltage for the controller 452 (e.g., a chip) and generates the ramp voltage 543. In certain examples, based at least in part on the compensation voltage 557 (e.g., $V_{comp}$) and the ramp voltage 543 (e.g., $V_{ramp}$), the comparator 544 generates a logic signal 567 at the output terminal 566. For example, if the ramp voltage 543 is larger than the compensation voltage 557, the logic signal 567 is at a logic high level. As an example, if the ramp voltage 543 is smaller than the compensation voltage 557, the logic signal 567 is at a logic low level.

In certain embodiments, the feedback voltage 483 is also received by the demagnetization detector 546, which generates a logic signal 547 based at least in part on the feedback voltage 483. For example, if the feedback voltage 483 indicates that the demagnetization process of the transformer (e.g., a transformer T) has ended, the logic signal 547 is at a logic high level, and if the feedback voltage 483 does not indicate that the demagnetization process of the transformer (e.g., a transformer T) has ended, the logic signal 547 is at a logic low level. As an example, if the feedback voltage 483 indicates the end of the demagnetization process of the transformer (e.g., a transformer T), the logic signal 547 changes from the logic low level to the logic high level.

According to some embodiments, the drive signal generator 548 receives the logic signal 567 from the comparator 544 and receives the logic signal 547 from the demagnetization detector 546. In certain examples, based at least in part on the logic signals 567 and 547, the drive signal generator 548 generates the drive voltage 448. For example, if the logic signal 547 (e.g., the "on" signal) changes from the logic low level to the logic high level, the drive signal generator 548 generates the drive voltage 448 (e.g., $V_{gate}$) to change the transistor 450 from being turned off to being turned on. As an example, if the logic signal 567 (e.g., the "off" signal) changes from the logic low level to the logic high level, the drive signal generator 548 generates the drive voltage 448 (e.g., $V_{gate}$) to change the transistor 450 from being turned on to being turned off.

According to certain embodiments, the variable resistor network 534 includes N switches and N resistors. For example, N is an integer larger than 1. In some examples, the N switches include switches $K_1$, $K_2$, ..., $K_n$, ..., and $K_N$, and the N resistors include resistors $R_1$, $R_2$, ..., $R_n$, ..., and $R_N$, wherein n is an integer that is larger than 1 but smaller than or equal to N. For example, the switch $K_1$ and the resistor $R_1$ are in series, the switch $K_2$ and the resistor $R_2$ are in series, ..., the switch $K_n$ and the resistor $R_n$ are in series, ..., and the switch $K_N$ and the resistor $R_N$ are in series. As an example, the combination of the switch $K_1$ and the resistor $R_1$, the combination of the switch $K_2$ and the resistor $R_2$, ..., the combination of the switch $K_n$ and the resistor $R_n$, ..., and the combination of the switch $K_N$ and the resistor $R_N$ are in parallel. In certain examples, one terminal of the switch $K_1$, one terminal of the switch $K_2$, ..., one terminal of the switch $K_n$, ..., and one terminal of the switch $K_N$, are connected and biased at the compensation voltage 557 (e.g., $V_{comp}$), and one terminal of the resistor $R_1$, one terminal of the resistor $R_2$, ..., one terminal of the resistor $R_n$, ..., and one terminal of the resistor $R_N$ are connected to one same terminal of the capacitor 476. According to some embodiments, the resistance of the resistor $R_{n-1}$ is larger than the resistance of the resistor $R_n$, wherein n is an integer that is larger than 1 but smaller than or equal to N. For example, the resistance of the resistor $R_1$ is larger than the resistance of the resistor $R_2$.

In some embodiments, N is equal to 2, and the N switches include only the switch $K_1$ and the switch $K_2$, and the N resistors include only the resistor $R_1$ and the resistor $R_2$. For example, the switch $K_1$ and the resistor $R_1$ are in series, and the switch $K_2$ and the resistor $R_2$ are in series. As an example, the combination of the switch $K_1$ and the resistor $R_1$ and the combination of the switch $K_2$ and the resistor $R_2$ are in parallel. In certain examples, one terminal of the switch $K_1$ and one terminal of the switch $K_2$ are connected and biased at the compensation voltage 557 (e.g., $V_{comp}$), and one terminal of the resistor $R_1$ and one terminal of the resistor $R_2$ are connected to one same terminal of the capacitor 476. In some examples, the resistance of the resistor $R_1$ is larger than the resistance of the resistor $R_2$.

In certain embodiments, the variable resistor network 534 receives the control signals $521_1$, $521_2$, ..., $521_n$, ..., and $521_N$, wherein N is an integer larger than 1. For example, the variable resistor network 534 has a network resistance that can be changed by the control signals $521_1$, $521_2$, ..., $521_n$, ..., and $521_N$. In some examples, with N being equal to 2, the N switches include only the switch $K_1$ and the switch $K_2$, and the N resistors include only the resistor $R_1$ and the resistor $R_2$. For example, the switch $K_1$ and the resistor $R_1$ are in series, and the switch $K_2$ and the resistor $R_2$ are in series. As an example, the combination of the switch $K_1$ and the resistor $R_1$ and the combination of the switch $K_2$ and the resistor $R_2$ are in parallel. In certain examples, if the switch $K_1$ is closed and the switch $K_2$ is open, the network resistance is set equal to the resistance of the resistor $R_1$, and if the switch $K_1$ is open and the switch $K_2$ is closed, the network resistance is set equal to the resistance of the resistor $R_2$.

In certain embodiments, the switches $K_1$, $K_2$, ..., $K_n$, ..., and $K_N$ receive the control signals $521_1$, $521_2$, ..., $521_n$, ..., and $521_N$, respectively. In certain examples, the control signals $521_1$, $521_2$, ..., $521_n$, ..., and $521_N$ close or open the switches $K_1$, $K_2$, ..., $K_n$, ..., and $K_N$ respectively. For example, if the control signal $521_n$ is at a logic high level, the switch $K_n$ is closed. As an example, if the control signal $521_n$ is at a logic low level, the switch $K_n$ is open. In some examples, if the switch $K_n$ is closed, the resistor $R_n$ is used by the compensation voltage generator 530 to generate the compensation voltage 557 (e.g., $V_{comp}$), and if the switch $K_n$ is open, the resistor $R_n$ is not used by the compensation voltage generator 530 to generate the compensation voltage 557 (e.g., $V_{comp}$).

As shown in FIG. 5, the resistor selector 520 receives the sampled voltage 511 (e.g., $V_{FB\_S}$) and generates the control signals $521_1$, $521_2$, ..., $521_n$, ..., and $521_N$ based at least in part on the sampled voltage 511 (e.g., $V_{FB\_S}$) according to some embodiments. For example, the resistor selector 520 uses the amplitude of the sampled voltage 511 (e.g., $V_{FB\_S}$) to generate the control signals $521_1$, $521_2$, ..., $521_n$, ..., and $521_N$. As an example, the amplitude of the sampled voltage 511 (e.g., $V_{FB\_S}$) describes the fluctuations of the sampled voltage 511 (e.g., $V_{FB\_S}$). For example, one or more control signals of the control signals $521_1$, $521_2$, ..., $521_n$, ..., and $521_N$ are at the logic high level, and one or more control signals of the control signals $521_1$, $521_2$, ..., $521_n$, ..., and $521_N$ are at the logic low level.

Figure 6:
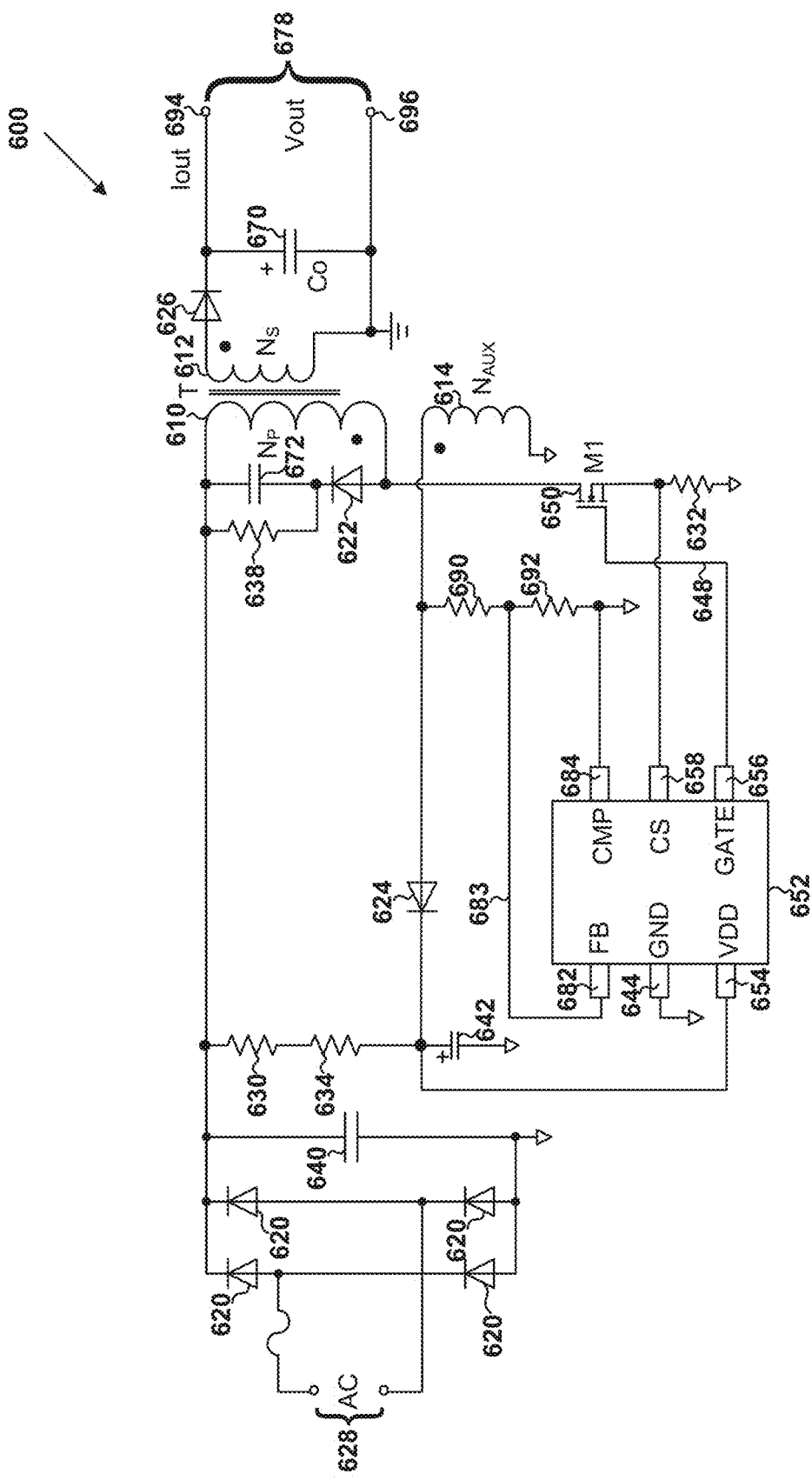
FIG. 6 is a simplified diagram showing a switch-mode power converter according to some embodiments of the present invention.

FIG. 6 is a simplified diagram showing a switch-mode power converter according to some embodiments of the present invention. This diagram is merely an example, which should not unduly limit the scope of the claims. One of ordinary skill in the art would recognize many variations, alternatives, and modifications. As shown in FIG. 6, the switch-mode power converter 600 includes a primary winding 610, a secondary winding 612, and an auxiliary winding 614, which are parts of a transformer (e.g., a transformer T). On the primary side, the power converter 600 includes a bridge rectifier 620 (e.g., a rectifier that includes four diodes), diodes 622, 624 and 626, resistors 630, 632, 634, 690 and 692, capacitors 640, 642 and 672, a transistor 650, and a controller 652 (e.g., a chip). Additionally, on the secondary side, the power converter 600 includes a capacitor 670 and output terminals 694 and 696. In certain examples, the power converter 600 serves as a power supply that provides an output voltage 678. For example, the output voltage 678 is constant in average. In some examples, the controller 652 (e.g., a chip) includes a terminal 644 (e.g., a pin), a terminal 654 (e.g., a pin), a terminal 656 (e.g., a pin), a terminal 658 (e.g., a pin), a terminal 682 (e.g., a pin), and a terminal 684 (e.g., a pin). For example, the controller 652 (e.g., a chip) is implemented according to FIG. 7.

Although the above has been shown using a selected group of components for the power converter 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 6, an alternating current (AC) input voltage 628 (e.g., $V_{AC}$) is rectified by the bridge rectifier 620 and then filtered by the capacitor 640 according to certain embodiments. For example, one terminal of the capacitor 640 is connected to one terminal of the resistor 630, one terminal of the resistor 638, one terminal of the capacitor 672, and one terminal of the primary winding 610. As an example, another terminal of the capacitor 640 is biased to a ground voltage on the primary side. For example, another terminal of the resistor 638 and another terminal of the capacitor 672 are connected to one terminal of the diode 622. As an example, another terminal of the primary winding 610 is connected to another terminal of the diode 622 and the drain terminal of the transistor 650.

In some embodiments, another terminal of the resistor 630 is connected to one terminal of the resistor 634, and another terminal of the resistor 634 is connected to one terminal of the capacitor 642, one terminal of the diode 624, and the terminal 654 of the controller 652. For example, another terminal of the diode 624 is connected to one terminal of the resistor 690 and one terminal of the auxiliary winding 614. As an example, another terminal of the auxiliary winding 614 is biased to the ground voltage on the primary side. For example, another terminal of the resistor 690 is connected to the terminal 682 of the controller 652 and one terminal of the resistor 692. As an example, the terminal 682 of the controller 452 receives a feedback voltage 683. For example, another terminal of the resistor 692 is connected to the terminal 684 of the controller 652 and is biased to the ground voltage on the primary side.

In certain embodiments, the terminal 656 of the controller 652 is connected to the gate terminal of the transistor 650. For example, the controller 652 outputs a drive voltage 648 through the terminal 656 to the gate terminal of the transistor 650. As an example, the terminal 658 of the controller 652 is connected to the source terminal of the transistor 650 and is also connected to one terminal of the resistor 632. For example, another terminal of the resistor 632 and the terminal 644 of the controller 652 both are biased to the ground voltage on the primary side. As an example, the terminal 684 of the controller 652 is biased to the ground voltage on the primary side.

As shown in FIG. 6, one terminal of the secondary winding 612 is connected to one terminal of the diode 626, and another terminal of the diode 626 is connected to one terminal of the capacitor 670 and the output terminal 694 according to some embodiments. For example, another terminal of the secondary winding 612 is connected to another terminal of the capacitor 670 and the output terminal 696. As an example, the output terminal 696 is biased to a ground voltage on the secondary side. For example, the output terminals 694 and 696 provide the output voltage 678 (e.g., $V_{out}$) to a load of the power converter 600.

According to certain embodiments, the terminal 682 of the controller 652 receives the feedback voltage 683 from a voltage divider that includes the resistors 690 and 692. For example, one terminal of the resistor 690 receives a voltage from the auxiliary winding 614 of the transformer (e.g., a transformer T), and the feedback voltage 683 is used to represent the output voltage 678. As an example, during a demagnetization process when the transistor 650 is turned off, the feedback voltage 683 (e.g., $V_{FB}$) changes linearly with the output voltage 678 (e.g., $V_{out}$).

Figure 7:
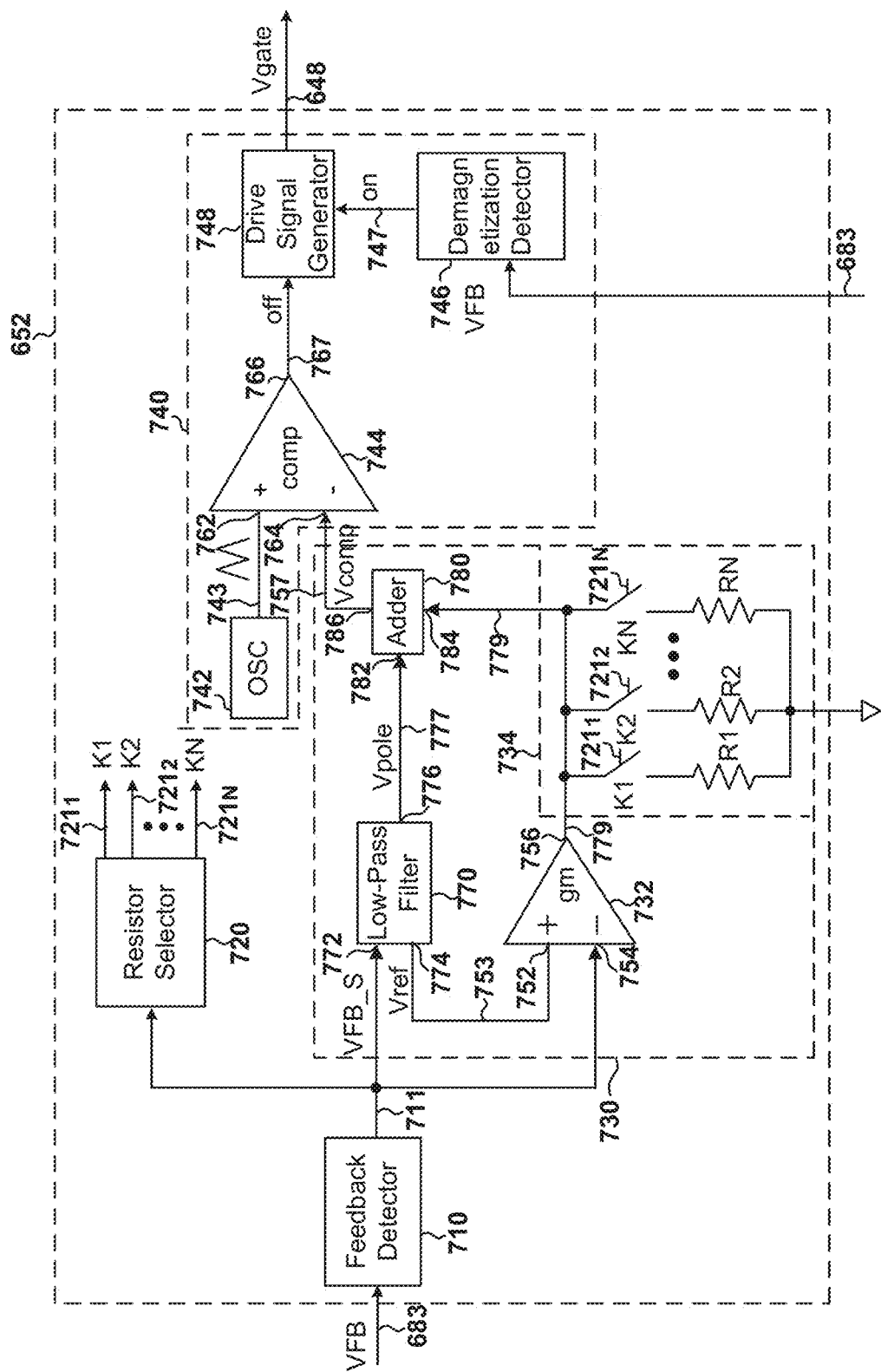
FIG. 7 is a simplified diagram showing the controller as part of the switch-mode power converter as shown in FIG. 6 according to certain embodiments of the present invention.

In some embodiments, the controller 652 (e.g., a chip) is implemented according to FIG. 7. For example, the terminal 682 of the controller 652 receives the feedback voltage 683, and the terminal 684 of the controller 652 is biased to the ground voltage on the primary side of the switch-mode power converter 600. As an example, the terminal 656 of the controller 652 outputs the drive voltage 648.

FIG. 7 is a simplified diagram showing the controller 652 as part of the switch-mode power converter 600 as shown in FIG. 6 according to certain embodiments of the present invention. This diagram is merely an example, which should not unduly limit the scope of the claims. One of ordinary skill in the art would recognize many variations, alternatives, and modifications. The controller 652 includes a feedback detector 710, a resistor selector 720, a transconductance amplifier 732, a variable resistor network 734, an oscillator 742, a comparator 744, a demagnetization detector 746, a drive signal generator 748, a low-pass filter 770, and an adder 780. For example, the transconductance amplifier 732, the variable resistor network 734, the low-pass filter 770, and the adder 780 are parts of a compensation voltage generator 730. As an example, the oscillator 742, the comparator 744, the demagnetization detector 746, and the drive signal generator 748 are parts of a drive voltage generator 740. Although the above has been shown using a selected group of components for the controller 652, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the feedback detector 710 receives the feedback voltage 683 (e.g., $V_{FB}$), samples the received feedback voltage 683, and generates a sampled voltage 711 (e.g., $V_{FB\_S}$). For example, the sampled voltage 711 (e.g., $V_{FB\_S}$) is received by an input terminal 754 (e.g., the "−" terminal) of the transconductance amplifier 732, which also includes an input terminal 752 (e.g., the "+" terminal) and an output terminal 756. As an example, the input terminal 752 (e.g., the "+" terminal) of the transconductance amplifier 732 receives a reference voltage 753 (e.g., $V_{ref}$).

In certain examples, based at least in part on the sampled voltage 711 (e.g., $V_{FB\_S}$) and the reference voltage 753 (e.g., $V_{ref}$), the transconductance amplifier 732 generates a current that generates a voltage 779 with a compensation network, which includes the variable resistor network 734. For example, the variable resistor network 734 is biased to the ground voltage on the primary side through the terminal 684. As an example, the output terminal 756 of the transconductance amplifier 732 is biased at the voltage 779. For example, the variable resistor network 734 outputs the voltage 779 to an input terminal 784 of the adder 780. In some examples, the variable resistor network 734 has a network resistance that can be changed by control signals $721_1, 721_2, \ldots, 721_n, \ldots,$ and $721_N$, wherein N is an integer larger than 1. For example, the voltage 779 is generated based at least in part on the network resistance of the variable resistor network 734. As an example, if the network resistance of the variable resistor network 734 is changed by the control signals $721_1, 721_2, \ldots, 721_n, \ldots,$ and $721_N$, the voltage 779 also changes.

In certain embodiments, the low-pass filter 770) includes input terminals 772 and 774 and an output terminal 776. For example, the input terminal 772 receives the sampled voltage 711 (e.g., $V_{FB\_S}$), and the input terminal 774 receives the reference voltage 753 (e.g., $V_{ref}$). In some examples, based at least in part on the sampled voltage 711 (e.g., $V_{FB\_S}$) and the reference voltage 753 (e.g., $V_{ref}$), the low-pass filter 770 generates a voltage 777. For example, the low-pass filter 770 outputs the voltage 777 at the output terminal 776. As an example, the low-pass filter 770) determines a difference voltage that is equal to the sampled voltage 711 (e.g., $V_{FB\_S}$) minus the reference voltage 753 (e.g., $V_{ref}$), determines an integral of the difference voltage with respect to time, and uses the determined integral to generate the voltage 777.

According to some embodiments, the adder 780) includes an input terminal 782, the input terminal 784, and an output terminal 786. For example, the input terminal 782 receives the voltage 777, and the input terminal 784 receives the voltage 779. In certain examples, based at least in part on the voltages 777 and 779, the adder 780 generates the compensation voltage 757. For example, the adder 780 outputs the compensation voltage 757 at the output terminal 786. As an example, the compensation voltage 757 is equal to a sum of the voltage 777 and the voltage 779.

According to certain embodiments, the compensation voltage 757 is received by an input terminal 764 (e.g., the "−" terminal) of the comparator 744, which also includes an input terminal 762 (e.g., the "+" terminal) and an output terminal 766. For example, the input terminal 762 (e.g., the "−" terminal) of the comparator 744 receives a ramp voltage 743 from the oscillator 742. As an example, the oscillator 742 receives a supply voltage for the controller 652 (e.g., a chip) and generates the ramp voltage 743. In some examples, based at least in part on the compensation voltage 757 (e.g., $V_{comp}$) and the ramp voltage 743 (e.g., $V_{ramp}$), the comparator 744 generates a logic signal 767 at the output terminal 766. For example, if the ramp voltage 743 is larger than the compensation voltage 757, the logic signal 767 is at a logic high level. As an example, if the ramp voltage 743 is smaller than the compensation voltage 757, the logic signal 767 is at a logic low level.

In some embodiments, the feedback voltage 683 is also received by the demagnetization detector 746, which generates a logic signal 747 based at least in part on the feedback voltage 683. For example, if the feedback voltage 683 indicates that the demagnetization process of the transformer (e.g., a transformer T) has ended, the logic signal 747 is at a logic high level, and if the feedback voltage 683 does not indicate that the demagnetization process of the transformer (e.g., a transformer T) has ended, the logic signal 747 is at a logic low level. As an example, if the feedback voltage 683 indicates the end of the demagnetization process of the transformer (e.g., a transformer T), the logic signal 747 changes from the logic low level to the logic high level.

In certain embodiments, the drive signal generator 748 receives the logic signal 767 from the comparator 744 and receives the logic signal 747 from the demagnetization detector 746. In certain examples, based at least in part on the logic signals 767 and 747, the drive signal generator 748 generates the drive voltage 648. For example, if the logic signal 747 (e.g., the "on" signal) changes from the logic low level to the logic high level, the drive signal generator 748 generates the drive voltage 648 (e.g., $V_{gate}$) to change the transistor 650 from being turned off to being turned on. As an example, if the logic signal 767 (e.g., the "off" signal) changes from the logic low level to the logic high level, the drive signal generator 748 generates the drive voltage 648 (e.g., $V_{gate}$) to change the transistor 650 from being turned on to being turned off.

According to some embodiments, the variable resistor network 734 includes N switches and N resistors. For example, N is an integer larger than 1. In some examples, the N switches include switches $K_1, K_2, \ldots, K_n, \ldots,$ and $K_N$, and the N resistors include resistors $R_1, R_2, \ldots, R_n, \ldots,$ and $R_N$, wherein n is an integer that is larger than 1 but smaller than or equal to N. For example, the switch $K_1$ and the resistor $R_1$ are in series, the switch $K_2$ and the resistor $R_2$ are in series, ..., the switch $K_n$ and the resistor $R_n$ are in series, ..., and the switch $K_N$ and the resistor $R_N$ are in series. As an example, the combination of the switch $K_1$ and the resistor $R_1$, the combination of the switch $K_2$ and the resistor $R_2$, ..., the combination of the switch $K_n$ and the resistor $R_n$, ..., and the combination of the switch $K_N$ and the resistor $R_N$ are in parallel. In certain examples, one terminal of the switch $K_1$, one terminal of the switch $K_2$, ..., one terminal of the switch $K_n$, ..., and one terminal of the switch $K_N$, are connected and biased at the voltage 779, and one terminal of the resistor $R_1$, one terminal of the resistor $R_2$, ..., one terminal of the resistor $R_n$, ..., and one terminal of the resistor $R_N$ are biased to the ground voltage on the primary side. According to certain embodiments, the resistance of the resistor $R_{n-1}$ is larger than the resistance of the resistor $R_n$, wherein n is an integer that is larger than 1 but smaller than or equal to N. For example, the resistance of the resistor $R_1$ is larger than the resistance of the resistor $R_2$.

In certain embodiments, N is equal to 2, and the N switches include only the switch $K_1$ and the switch $K_2$, and the N resistors include only the resistor $R_1$ and the resistor $R_2$. For example, the switch $K_1$ and the resistor $R_1$ are in series, and the switch $K_2$ and the resistor $R_2$ are in series. As an example, the combination of the switch $K_1$ and the resistor $R_1$ and the combination of the switch $K_2$ and the resistor $R_2$ are in parallel. In certain examples, one terminal of the switch $K_1$ and one terminal of the switch $K_2$ are connected and biased at the voltage 779, and one terminal of the resistor $R_1$ and one terminal of the resistor $R_2$ are biased to the ground voltage on the primary side. In some examples, the resistance of the resistor $R_1$ is larger than the resistance of the resistor $R_2$.

In certain embodiments, the variable resistor network 734 receives the control signals $721_1, 721_2, \ldots, 721_n, \ldots,$ and $721_N$, wherein N is an integer larger than 1. For example, the variable resistor network 734 has a network resistance that can be changed by the control signals $721_1, 721_2, \ldots, 721_n, \ldots,$ and $721_N$. In some examples, with N being equal to 2, the N switches include only the switch $K_1$ and the switch $K_2$, and the N resistors include only the resistor $R_1$ and the resistor $R_2$. For example, the switch $K_1$ and the resistor $R_1$ are in series, and the switch $K_2$ and the resistor $R_2$ are in series. As an example, the combination of the switch $K_1$ and the resistor $R_1$ and the combination of the switch $K_2$ and the resistor $R_2$ are in parallel. In certain examples, if the switch $K_1$ is closed and the switch $K_2$ is open, the network resistance is set equal to the resistance of the resistor $R_1$, and if the switch $K_1$ is open and the switch $K_2$ is closed, the network resistance is set equal to the resistance of the resistor $R_2$. In some embodiments, the switches $K_1, K_2, \ldots, K_n, \ldots,$ and $K_N$ receive control signals $721_1, 721_2, \ldots, 721_n, \ldots,$ and $721_N$, respectively. In certain examples, the control signals $721_1, 721_2, \ldots, 721_n, \ldots,$ and $721_N$ close or open the switches $K_1, K_2, \ldots, K_n, \ldots,$ and $K_N$ respectively. For example, if the control signal $721_n$ is at a logic high level, the switch $K_n$ is closed. As an example, if the control signal $721_n$ is at a logic low level, the switch $K_n$ is open. In some examples, if the switch $K_n$ is closed, the resistor $R_n$ is used by the compensation voltage generator 530 to generate the voltage 779, and if the switch $K_n$ is open, the resistor $R_n$ is not used by the compensation voltage generator 530 to generate the voltage 779.

As shown in FIG. 7, the resistor selector 720 receives the sampled voltage 711 (e.g., $V_{FB\_S}$) and generates the control signals $721_1, 721_2, \ldots, 721_n, \ldots,$ and $721_N$ based at least in part on the sampled voltage 711 (e.g., $V_{FB\_S}$) according to certain embodiments. For example, the resistor selector 720 uses the amplitude of the sampled voltage 711 (e.g., $V_{FB\_S}$) to generate the control signals $721_1, 721_2, \ldots, 721_n, \ldots,$ and $721_N$. As an example, the amplitude of the sampled voltage 711 (e.g., $V_{FB\_S}$) describes the fluctuations of the sampled voltage 711 (e.g., $V_{FB\_S}$). For example, one or more control signals of the control signals $721_1, 721_2, \ldots, 721_n, \ldots,$ and $721_N$ are at the logic high level, and one or more control signals of the control signals $721_1, 721_2, \ldots, 721_n, \ldots,$ and $721_N$ are at the logic low level.

Figure 8:
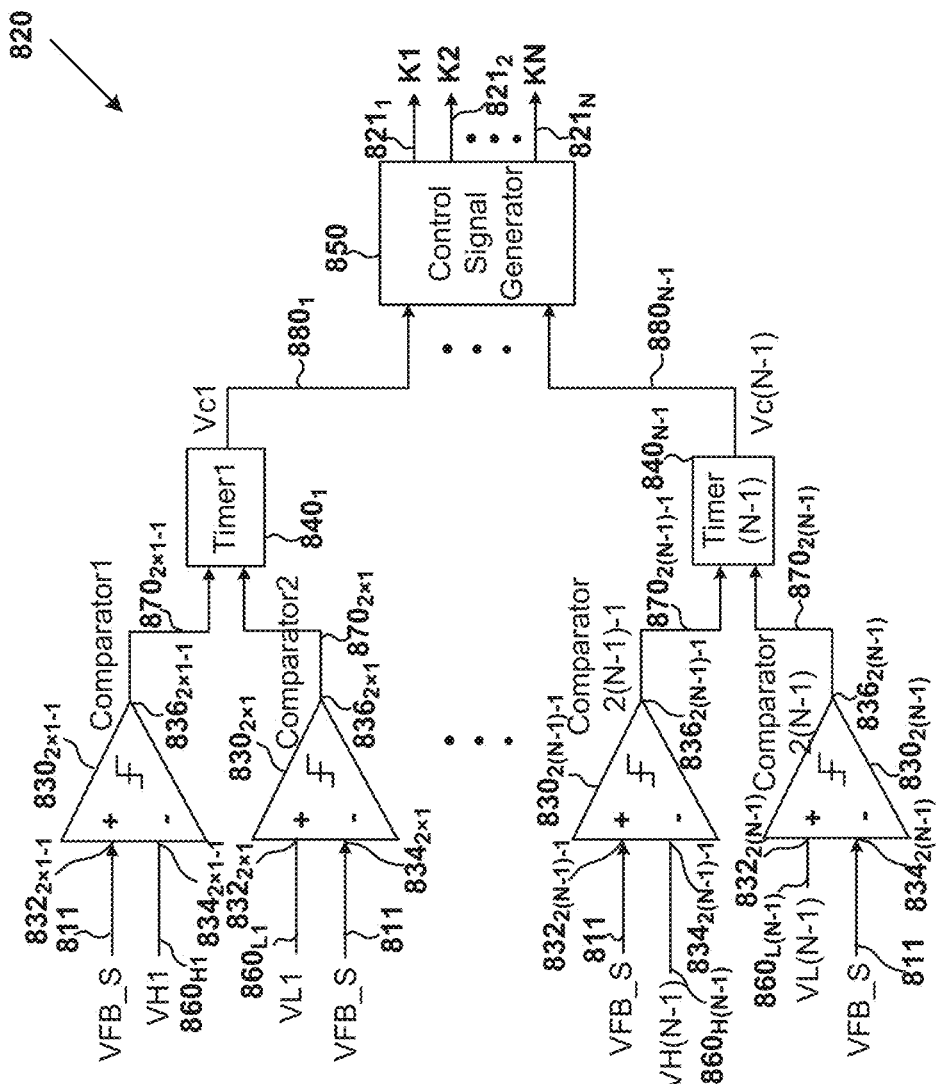
FIG. 8 is a simplified diagram showing a resistor selector as part of the controller as shown in FIG. 5 of the switch-mode power converter as shown in FIG. 4 and/or as part of the controller as shown in FIG. 7 of the switch-mode power converter as shown in FIG. 6 according to certain embodiments of the present invention.

FIG. 8 is a simplified diagram showing a resistor selector as part of the controller 452 as shown in FIG. 5 of the switch-mode power converter 400 as shown in FIG. 4 and/or as part of the controller 652 as shown in FIG. 7 of the switch-mode power converter 600 as shown in FIG. 6 according to certain embodiments of the present invention. This diagram is merely an example, which should not unduly limit the scope of the claims. One of ordinary skill in the art would recognize many variations, alternatives, and modifications. The resistor selector 820 includes 2×(N−1) comparators, (N−1) timers, and a control signal generator 850. For example, N is an integer larger than 1. As an example, N is equal to 2. Although the above has been shown using a selected group of components for the resistor selector 820, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 8, the resistor selector 820 receives a sampled voltage 811 and generates N control signals that include control signals $821_1, 821_2, \ldots, 821_n, \ldots,$ and $821_N$, according to some embodiments. For example, N is an integer larger than 1. As an example, n is an integer that is larger than 1 but smaller than or equal to N. In certain examples, the resistor selector 820 is used as the resistor selector 520. For example, the sampled voltage 811 is the sampled voltage 511. As an example, the control signals $821_1, 821_2, \ldots, 821_n, \ldots,$ and $821_N$ are the control signals $521_1, 521_2, \ldots, 521_n, \ldots,$ and $521_N$, respectively, wherein N is an integer larger than 1, and n is an integer that is larger than 1 but smaller than or equal to N. In some examples, the resistor selector 820 is used as the resistor selector 720. For example, the sampled voltage 811 is the sampled voltage 711. As an example, the control signals $821_1, 821_2, \ldots, 821_n, \ldots,$ and $821_N$ are the control signals $721_1, 721_2, \ldots, 721_n, \ldots,$ and $721_N$, respectively, wherein N is an integer larger than 1, and n is an integer that is larger than 1 but smaller than or equal to N.

In certain embodiments, the 2×(N−1) comparators include a comparator $830_{2\times1-1}$, a comparator $830_{2\times1}, \ldots,$ a comparator $830_{2\times m-1}$, a comparator $830_{2\times m}, \ldots,$ a comparator $830_{2\times(N-1)-1}$, and a comparator $830_{2\times(N-1)}$, wherein N is an integer larger than 1 and m is an integer that is larger than 0 but smaller than N. In some embodiments, the (N−1) timers include a timer $840_1, \ldots, 840_m, \ldots,$ and $840_{N-1}$, wherein N is an integer larger than 1 and m is an integer that is larger than 0 but smaller than N.

According to some embodiments, the comparator $830_{2\times m-1}$ includes an input terminal $832_{2\times m-1}$ (e.g., the "+" terminal), an input terminal $834_{2\times m-1}$ (e.g., the "−" terminal), and an output terminal $836_{2\times m-1}$, wherein m is an integer that is larger than 0 but smaller than N, and N is an integer larger than 1. For example, the input terminal $832_{2\times m-1}$ (e.g., the "+" terminal) receives the sampled voltage 811, and the input terminal $834_{2\times m-1}$ (e.g., the "−" terminal) receives a reference voltage $860_{Hm}$. As an example, the output terminal $836_{2\times m-1}$ outputs a comparison signal $870_{2\times m-1}$ based at least in part on the sampled voltage 811 and the reference voltage $860_{Hm}$. In certain examples, the comparator $830_{2\times1-1}$ includes an input terminal $832_{2\times1-1}$ (e.g., the "+" terminal), an input terminal $834_{2\times1-1}$ (e.g., the "−" terminal), and an output terminal $836_{2\times1-1}$, wherein the input terminal $832_{2\times1-1}$ (e.g., the "+" terminal) receives the sampled voltage 811, the input terminal $834_{2\times1-1}$ (e.g., the "−" terminal) receives the reference voltage $860_{H1}$, and the output terminal $836_{2\times1-1}$ outputs a comparison signal $870_{2\times1-1}$ based at least in part on the sampled voltage 811 and the reference voltage $860_{H1}$. In some examples, the comparator $830_{2\times(N-1)-1}$ includes an input terminal $832_{2\times(N-1)-1}$ (e.g., the "+" terminal), an input terminal $834_{2\times(N-1)-1}$ (e.g., the "−" terminal), and an output terminal $836_{2\times(N-1)-1}$, wherein the input terminal $832_{2\times(N-1)-1}$ (e.g., the "+" terminal) receives the sampled voltage 811, the input terminal $834_{2\times(N-1)-1}$ (e.g., the "−" terminal) receives the reference voltage $860_{H(N-1)}$, and the output terminal $836_{2\times(N-1)-1}$ outputs a comparison signal $870_{2\times(N-1)-1}$ based at least in part on the sampled voltage 811 and the reference voltage $860_{H(N-1)}$.

According to certain embodiments, the comparator $830_{2\times m}$ includes an input terminal $832_{2\times m}$ (e.g., the "+" terminal), an input terminal $834_{2\times m}$ (e.g., the "−" terminal), and an output terminal $836_{2\times m}$, wherein m is an integer that is larger than 0 but smaller than N, and N is an integer larger than 1. For example, the input terminal $832_{2\times m}$ (e.g., the "+" terminal) receives a reference voltage $860_{Lm}$, and the input terminal $834_{2\times m}$ (e.g., the "−" terminal) receives the sampled voltage 811. As an example, the output terminal $836_{2\times m}$ outputs a comparison signal $870_{2\times m}$ based at least in part on the sampled voltage 811 and the reference voltage $860_{Lm}$. In some examples, the comparator $830_{2\times1}$ includes an input terminal $832_{2\times1}$ (e.g., the "+" terminal), an input terminal $834_{2\times1}$ (e.g., the "−" terminal), and an output terminal $836_{2\times1}$, wherein the input terminal $832_{2\times1}$ (e.g., the "+" terminal) receives the reference voltage $860_{L1}$, the input terminal $834_{2\times1}$ (e.g., the "−" terminal) receives the sampled voltage 811, and the output terminal $836_{2\times1}$ outputs a comparison signal $870_{2\times1}$ based at least in part on the sampled voltage 811 and the reference voltage $860_{L1}$. In some examples, the comparator $830_{2\times(N-1)}$ includes an input terminal $832_{2\times(N-1)}$ (e.g., the "+" terminal), an input terminal $834_{2(N-1)}$ (e.g., the "−" terminal), and an output terminal $836_{2\times(N-1)}$, wherein the input terminal $832_{2\times(N-1)}$ (e.g., the "+" terminal) receives the reference voltage $860_{L(N-1)}$, the input terminal $834_{2\times(N-1)}$ (e.g., the "−" terminal) receives the sampled voltage 811, and the output terminal $836_{2\times(N-1)}$ outputs a comparison signal $870_{2\times(N-1)}$ based at least in part on the sampled voltage 811 and the reference voltage $860_{L(N-1)}$.

In some embodiments, the timer $840_m$ receives the comparison signal $870_{2\times m-1}$ and the comparison signal $870_{2\times m}$ and generates a timer signal $880_m$, wherein m is an integer that is larger than 0 but smaller than N, and N is an integer larger than 1. In certain examples, the timer $840_m$ determines whether both of the comparison signal $870_{2 \times m-1}$ and the comparison signal $870_{2 \times m}$ remain at a logic low level during a predetermined time duration (e.g., 10 ms). For example, if the timer $840_m$ determines that both of the comparison signal $870_{2 \times m-1}$ and the comparison signal $870_{2 \times m}$ remain at the logic low level during the predetermined time duration (e.g., 10 ms), the timer $840_m$ generates the timer signal $880_m$ that indicates the sampled voltage 811 remains smaller than the reference voltage $860_{Hm}$ and remains larger than the reference voltage $860_{Lm}$ during the predetermined time duration (e.g., 10 ms). As an example, if the timer $840_m$ determines that the comparison signal $870_{2 \times m-1}$ is at a logic high level and/or the comparison signal $870_{2 \times m}$ is at the logic high level at any time during the predetermined time duration (e.g., 10 ms), the timer $840_m$ generates the timer signal $880_m$ that indicates the sampled voltage 811 does not remain smaller than the reference voltage $860_{Hm}$ and/or does not remains larger than the reference voltage $860_{Lm}$ during the predetermined time duration (e.g., 10 ms). In some examples, the sampled voltage 811 fluctuates periodically with a fluctuation period $T_f$. For example, the predetermined time duration is equal to or longer than the fluctuation period $T_f$. As an example, the predetermined time duration is at least 10 ms.

In certain examples, the timer $840_1$ receives the comparison signal $870_{2 \times 1-1}$ and the comparison signal $870_{2 \times 1}$ and generates a timer signal $880_1$ (e.g., $V_{c1}$). For example, if the timer $840_1$ determines that both of the comparison signal $870_{2 \times 1-1}$ and the comparison signal $870_{2 \times 1}$ remain at the logic low level during the predetermined time duration (e.g., 10 ms), the timer $840_1$ generates the timer signal $880_1$ (e.g., $V_{c1}$) that indicates the sampled voltage 811 remains smaller than the reference voltage $860_{H1}$ and remains larger than the reference voltage $860_{L1}$ during the predetermined time duration (e.g., 10 ms). As an example, if the timer $840_1$ determines that the comparison signal $870_{2 \times 1-1}$ is at the logic high level and/or the comparison signal $870_{2 \times 1}$ is at the logic high level at any time during the predetermined time duration (e.g., 10 ms), the timer $840_1$ generates the timer signal $880_1$ that indicates the sampled voltage 811 does not remain smaller than the reference voltage $860_{H1}$ and/or does not remains larger than the reference voltage $860_{L1}$ during the predetermined time duration (e.g., 10 ms). In some examples, the timer $840_{N-1}$ receives the comparison signal $870_{2 \times (N-1)-1}$ and the comparison signal $870_{2 \times (N-1)}$ and generates a timer signal $880_{N-1}$ (e.g., $V_{c(N-1)}$). For example, if the timer $840_{N-1}$ determines that both of the comparison signal $870_{2 \times (N-1)-1}$ and the comparison signal $870_{2 \times (N-1)}$ remain at the logic low level during the predetermined time duration (e.g., 10 ms), the timer $840_{N-1}$ generates the timer signal $880_{N-1}$ (e.g., $V_{c(N-1)}$) that indicates the sampled voltage 811 remains smaller than the reference voltage $860_{H(N-1)}$ and remains larger than the reference voltage $860_{L(N-1)}$ during the predetermined time duration (e.g., 10 ms). As an example, if the timer $840_{N-1}$ determines that the comparison signal $870_{2 \times (N-1)-1}$ is at the logic high level and/or the comparison signal $870_{2 \times (N-1)}$ is at the logic high level at any time during the predetermined time duration (e.g., 10 ms), the timer $840_{N-1}$ generates the timer signal $880_{N-1}$ that indicates the sampled voltage 811 does not remain smaller than the reference voltage $860_{H(N-1)}$ and/or does not remains larger than the reference voltage $860_{L(N-1)}$ during the predetermined time duration (e.g., 10 ms).

In certain embodiments, the control signal generator 850 receives the N−1 timer signals that include the timer signals $880_1$, . . . , $880_m$, . . . , and $880_{N-1}$, and in response generates the N control signals that include the control signals $821_1$, $821_2$, . . . , $821_n$, . . . , and $821_N$, wherein N is an integer larger than 1, m is an integer that is larger than 0 but smaller than N, and n is an integer that is larger than 1 but smaller than or equal to N.

According to certain embodiments, N is an integer equal to 2. In some examples, the 2×(N−1) comparators include the comparator $830_{2 \times 1-1}$ and the comparator $830_{2 \times 1}$, and the (N−1) timer includes the timer $840_1$. In certain examples, the reference voltage $860_{H1}$ is larger than the reference voltage $860_{L1}$. In some examples, the timer $840_1$ determines whether the sampled voltage 811 remains larger than the reference voltage $860_{L1}$ and remains smaller than the reference voltage $860_{H1}$ during the predetermined time duration (e.g., 10 ms). For example, if the sampled voltage 811 remains larger than the reference voltage $860_{L1}$ and remains smaller than the reference voltage $860_{H1}$ during the predetermined time duration (e.g., 10 ms), the timer $840_1$ generates the timer signal $880_1$, which causes the control signal generator 850 to generate the control signals $821_1$ and $821_2$ to close the switch $K_1$ and open the switch $K_2$ as shown in FIG. 5 and/or FIG. 7. As an example, if the sampled voltage 811 does not remain smaller than the reference voltage $860_{H1}$ and/or does not remains larger than the reference voltage $860_{L1}$ during the predetermined time duration (e.g., if the sampled voltage 811 is larger than the reference voltage $860_{H1}$ and/or is smaller than the reference voltage $860_{L1}$ at any time during the predetermined time duration), the timer $840_1$ generates the timer signal $880_1$, which causes the control signal generator 850 to generate the control signals $821_1$ and $821_2$ to open the switch $K_1$ and close the switch $K_2$ as shown in FIG. 5 and/or FIG. 7. In certain examples, the resistance of the resistor $R_1$ is larger than the resistance of the resistor $R_2$.

In some examples, whether the sampled voltage 811 remains larger than the reference voltage $860_{L1}$ and remains smaller than the reference voltage $860_{H1}$ during the predetermined time duration (e.g., 10 ms) indicates whether the amplitude of the sampled voltage 811 is smaller than the reference voltage $860_{H1}$ minus the reference voltage $860_{L1}$. For example, if the sampled voltage 811 remains larger than the reference voltage $860_{L1}$ and remains smaller than the reference voltage $860_{H1}$ during the predetermined time duration (e.g., 10 ms), the amplitude of the sampled voltage 811 is smaller than the reference voltage $860_{H1}$ minus the reference voltage $860_{L1}$. As an example, if the sampled voltage 811 does not remain smaller than the reference voltage $860_{H1}$ and/or does not remain larger than the reference voltage $860_{L1}$ during the predetermined time duration (e.g., if the sampled voltage 811 is larger than the reference voltage $860_{H1}$ and/or is smaller than the reference voltage $860_{L1}$ at any time during the predetermined time duration), the amplitude of the sampled voltage 811 is larger than the reference voltage $860_{H1}$ minus the reference voltage $860_{L1}$.

In certain examples, if the amplitude of the sampled voltage 811 is smaller than the reference voltage $860_{H1}$ minus the reference voltage $860_{L1}$, the timer $840_1$ generates the timer signal $880_1$, which causes the control signal generator 850 to generate the control signals $821_1$ and $821_2$ to close the switch $K_1$ and open the switch $K_2$ as shown in FIG. 5 and/or FIG. 7. For example, if the amplitude of the sampled voltage 811 is larger than the reference voltage $860_{H1}$ minus the reference voltage $860_{L1}$, the timer $840_1$ generates the timer signal $880_1$, which causes the control signal generator 850 to generate the control signals $821_1$ and $821_2$ to open the switch $K_1$ and close the switch $K_2$ as shown in FIG. 5 and/or FIG. 7. As an example, the resistance of the resistor $R_1$ is larger than the resistance of the resistor $R_2$.

According to some embodiments, N is an integer larger than 2. In certain examples, the reference voltage $860_{Hj}$ is larger than the reference voltage $860_{Lj}$, and the reference voltage $860_{H(j-1)}$ is larger than the reference voltage $860_{L(j-1)}$, wherein j is an integer that is larger than 1 but smaller than N. For example, the reference voltage $860_{H(j-1)}$ is smaller than the reference voltage $860_{Hj}$, and the reference voltage $860_{L(j-1)}$ is larger than the reference voltage $860_{Lj}$. As an example, the reference voltage $860_{Hj}$>the reference voltage $860_{H(j-1)}$>the reference voltage $860_{L(j-1)}$>the reference voltage $860_{Lj}$. In some examples, the reference voltage $860_{H(j-1)}$ minus the reference voltage $860_{L(j-1)}$ is smaller than the reference voltage $860_{Hj}$ minus the reference voltage $860_{Lj}$. In certain examples, the resistance of the resistor $R_{n-1}$ is larger than the resistance of the resistor $R_n$, wherein n is an integer that is larger than 1 but smaller than or equal to N. For example, the resistance of the resistor $R_1$ is larger than the resistance of the resistor $R_2$.

In certain embodiments, the timer $840_j$ determines whether the sampled voltage 811 remains larger than the reference voltage $860_{Lj}$ and remains smaller than the reference voltage $860_{Hj}$ during the predetermined time duration (e.g., 10 ms), and the timer $840_{j-1}$ determines whether the sampled voltage 811 remains larger than the reference voltage $860_{L(j-1)}$ and remains smaller than the reference voltage $860_{H(j-1)}$ during the predetermined time duration (e.g., 10 ms).

In some examples, with N being an integer larger than 2, if the sampled voltage 811 remains larger than the reference voltage $860_{Lj}$ and remains smaller than the reference voltage $860_{Hj}$ during the predetermined time duration (e.g., 10 ms), and if the sampled voltage 811 is smaller than the reference voltage $860_{L(j-1)}$ and/or is larger than the reference voltage $860_{H(j-1)}$ at any time during the predetermined time duration (e.g., 10 ms), the timer $840_j$ and the timer $840_{j-1}$ generate the timer signals $880_j$ and $880_{j-1}$ respectively, which cause the control signal generator 850 to generate the control signals $821_j$ and $821_{j-1}$ to close the switch $K_j$ and open the switch $K_{j-1}$ as shown in FIG. 5 and/or FIG. 7. For example, the resistance of the resistor $R_{j-1}$ is larger than the resistance of the resistor $R_j$. As an example, when the switch $K_j$ is closed, all other switches among the N switches, including the switch $K_{j-1}$, are open.

In certain examples, with N being an integer larger than 2, if the sampled voltage 811 remains larger than the reference voltage $860_{L1}$ and remains smaller than the reference voltage $860_{H1}$ during the predetermined time duration (e.g., 10 ms), the timer $840_1$ generate the timer signal $880_1$, which causes the control signal generator 850 to generate the control signal $821_1$ to close the switch $K_1$ as shown in FIG. 5 and/or FIG. 7. For example, the resistance of the resistor $R_1$ is larger than the resistance of any of all other resistors among the N resistors, including the resistor $R_2$. As an example, when the switch $K_1$ is closed, all other switches among the N switches, including the switch $K_2$, are open.

In certain examples, with N being an integer larger than 2, if the sampled voltage 811 is smaller than the reference voltage $860_{L(N-1)}$ and/or is larger than the reference voltage $860_{H(N-1)}$ at any time during the predetermined time duration (e.g., 10 ms), the timer $840_{N-1}$ generate the timer signal $880_{N-1}$, which causes the control signal generator 850 to generate the control signal $821_N$ to close the switch $K_N$ as shown in FIG. 5 and/or FIG. 7. For example, the resistance of the resistor $R_N$ is smaller than the resistance of any of all other resistors among the N resistors. As an example, when the switch $K_N$ is closed, all other switches among the N switches, are open.

According to some embodiments, whether the sampled voltage 811 remains larger than the reference voltage $860_{Lj}$ and remains smaller than the reference voltage $860_{Hj}$ during the predetermined time duration (e.g., 10 ms) indicates whether the amplitude of the sampled voltage 811 is smaller than the reference voltage $860_{Hj}$ minus the reference voltage $860_{Lj}$. For example, if the sampled voltage 811 remains larger than the reference voltage $860_{Lj}$ and remains smaller than the reference voltage $860_{Hj}$ during the predetermined time duration (e.g., 10 ms), the amplitude of the sampled voltage 811 is smaller than the reference voltage $860_{Hj}$ minus the reference voltage $860_{Lj}$. As an example, if the sampled voltage 811 does not remain smaller than the reference voltage $860_{Hj}$ and/or does not remain larger than the reference voltage $860_{Lj}$ during the predetermined time duration (e.g., if the sampled voltage 811 is larger than the reference voltage $860_{Hj}$ and/or is smaller than the reference voltage $860_{Lj}$ at any time during the predetermined time duration), the amplitude of the sampled voltage 811 is larger than the reference voltage $860_{Hj}$ minus the reference voltage $860_{Lj}$.

According to certain embodiments, whether the sampled voltage 811 remains larger than the reference voltage $860_{L(j-1)}$ and remains smaller than the reference voltage $860_{H(j-1)}$ during the predetermined time duration (e.g., 10 ms) indicates whether the amplitude of the sampled voltage 811 is smaller than the reference voltage $860_{H(j-1)}$ minus the reference voltage $860_{L(j-1)}$. For example, if the sampled voltage 811 remains larger than the reference voltage $860_{L(j-1)}$ and remains smaller than the reference voltage $860_{H(j-1)}$ during the predetermined time duration (e.g., 10 ms), the amplitude of the sampled voltage 811 is smaller than the reference voltage $860_{H(j-1)}$ minus the reference voltage $860_{L(j-1)}$. As an example, if the sampled voltage 811 does not remain smaller than the reference voltage $860_{H(j-1)}$ and/or does not remain larger than the reference voltage $860_{L(j-1)}$ during the predetermined time duration (e.g., if the sampled voltage 811 is larger than the reference voltage $860_{H(j-1)}$ and/or is smaller than the reference voltage $860_{L(j-1)}$ at any time during the predetermined time duration), the amplitude of the sampled voltage 811 is larger than the reference voltage $860_{H(j-1)}$ minus the reference voltage $860_{L(j-1)}$.

In some examples, with N being an integer larger than 2, if the amplitude of the sampled voltage 811 is smaller than the reference voltage $860_{Hj}$ minus the reference voltage $860_{Lj}$ and the amplitude of the sampled voltage 811 is larger than the reference voltage $860_{H(j-1)}$ minus the reference voltage $860_{L(j-1)}$, the timer $840_j$ and the timer $840_{j-1}$ generate the timer signals $880_j$ and $880_{j-1}$ respectively, which cause the control signal generator 850 to generate the control signals $821_j$ and $821_{j-1}$ to close the switch $K_j$ and open the switch $K_{j-1}$ as shown in FIG. 5 and/or FIG. 7. For example, the resistance of the resistor $R_{j-1}$ is larger than the resistance of the resistor $R_j$. As an example, when the switch $K_j$ is closed, all other switches among the N switches, including the switch $K_{j-1}$, are open.

In certain examples, with N being an integer larger than 2, if the amplitude of the sampled voltage 811 is smaller than the reference voltage $860_{H1}$ minus the reference voltage $860_{L1}$, the timer $840_1$ generate the timer signal $880_1$, which causes the control signal generator 850 to generate the control signal $821_1$ to close the switch $K_1$ as shown in FIG. 5 and/or FIG. 7. For example, the resistance of the resistor $R_1$ is larger than the resistance of any of all other resistors among the N resistors, including the resistor $R_2$. As an example, when the switch $K_1$ is closed, all other switches among the N switches, including the switch $K_2$, are open.

In certain examples, with N being an integer larger than 2, if the amplitude of the sampled voltage 811 is larger than the reference voltage $860_{H(N-1)}$ minus the reference voltage $860_{L(N-1)}$, the timer $840_{N-1}$ generate the timer signal $880_{N-1}$, which causes the control signal generator 850) to generate the control signal $821_N$ to close the switch $K_N$ as shown in FIG. 5 and/or FIG. 7. For example, the resistance of the resistor $R_N$ is smaller than the resistance of any of all other resistors among the N resistors. As an example, when the switch $K_N$ is closed, all other switches among the N switches, are open.

Figure 9:
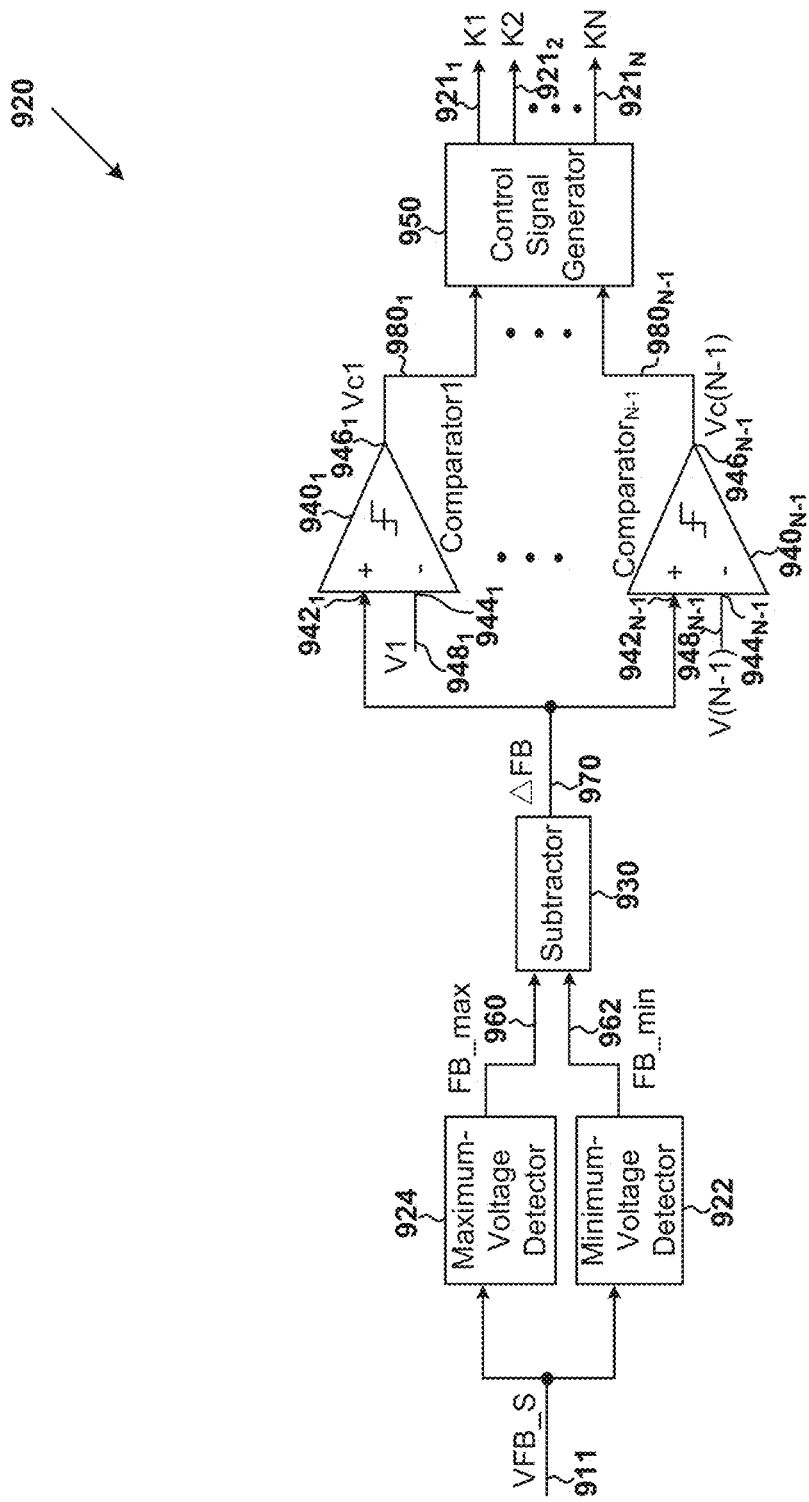
FIG. 9 is a simplified diagram showing a resistor selector as part of the controller as shown in FIG. 5 of the switch-mode power converter as shown in FIG. 4 and/or as part of the controller as shown in FIG. 7 of the switch-mode power converter as shown in FIG. 6 according to some embodiments of the present invention.

FIG. 9 is a simplified diagram showing a resistor selector as part of the controller 452 as shown in FIG. 5 of the switch-mode power converter 400 as shown in FIG. 4 and/or as part of the controller 652 as shown in FIG. 7 of the switch-mode power converter 600 as shown in FIG. 6 according to some embodiments of the present invention. This diagram is merely an example, which should not unduly limit the scope of the claims. One of ordinary skill in the art would recognize many variations, alternatives, and modifications. The resistor selector 920 includes a maximum-voltage detector 924, a minimum-voltage detector 922, a subtractor 930, (N−1) comparators, and a control signal generator 950. For example, N is an integer larger than 1. As an example, N is equal to 2. Although the above has been shown using a selected group of components for the resistor selector 920, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 9, the resistor selector 920 receives a sampled voltage 911 and generates N control signals that include control signals $921_1, 921_2, \ldots, 921_n, \ldots,$ and $921_N$, according to certain embodiments. For example, N is an integer larger than 1. As an example, n is an integer that is larger than 1 but smaller than or equal to N. In certain examples, the resistor selector 920 is used as the resistor selector 520. For example, the sampled voltage 911 is the sampled voltage 511. As an example, the control signals $921_1, 921_2, \ldots, 921_n, \ldots,$ and $921_N$ are the control signals $521_1, 521_2, \ldots, 521_n, \ldots,$ and $521_N$, respectively, wherein N is an integer larger than 1, and n is an integer that is larger than 1 but smaller than or equal to N. In some examples, the resistor selector 920 is used as the resistor selector 720. For example, the sampled voltage 911 is the sampled voltage 711. As an example, the control signals $921_1, 921_2, \ldots, 921_n, \ldots,$ and $921_N$ are the control signals $721_1, 721_2, \ldots, 721_n, \ldots,$ and $721_N$, respectively, wherein N is an integer larger than 1, and n is an integer that is larger than 1 but smaller than or equal to N.

In some embodiments, the maximum-voltage detector 924 receives the sampled voltage 911, detects a maximum voltage of the sampled voltage 911, and generates a voltage signal 960 (e.g., $V_{FB\_max}$) that represents the detected maximum voltage. In certain embodiments, the minimum-voltage detector 922 receives the sampled voltage 911, detects a minimum voltage of the sampled voltage 911, and generates a voltage signal 962 (e.g., $V_{FB\_min}$) that represents the detected minimum voltage. For example, the voltage signal 960 (e.g., $V_{FB\_max}$) and the voltage signal 962 (e.g., $V_{FB\_min}$) are received by the subtractor 930. As an example, the subtractor 930 subtract the voltage signal 962 (e.g., $V_{FB\_min}$) from the voltage signal 960 (e.g., $V_{FB\_max}$) and generates a voltage signal 970 (e.g., $\Delta V_{FB}$) that represents the voltage signal 960 minus the voltage signal 962. For example, the voltage signal 970 (e.g., $\Delta V_{FB}$) indicates the amplitude of the sampled voltage 911. As an example, the amplitude of the sampled voltage 911 describes the fluctuations of the sampled voltage 911.

In certain embodiments, the (N−1) comparators include comparators $940_1, \ldots, 940_k, \ldots,$ and $940_{N-1}$, wherein N is an integer larger than 1, and k is an integer that is larger than 0 but smaller than N. For example, N is equal to 2, and the (N−1) comparators include comparator $940_1$. As an example, N is equal to 3, and the (N−1) comparators include comparators $940_1$ and $940_2$. In some examples, the comparator $940_k$ includes an input terminal $942_k$ (e.g., the "+" terminal), an input terminal $944_k$ (e.g., the "−" terminal), and an output terminal $946_k$, wherein k is an integer that is larger than 0 but smaller than N, and N is an integer larger than 1. For example, the input terminal $942_k$ (e.g., the "+" terminal) receives the voltage signal 970 (e.g., $\Delta V_{FB}$), and the input terminal $944_k$ (e.g., the "−" terminal) receives a reference voltage $948_k$ (e.g., $V_k$). As an example, the output terminal $946_k$ outputs a comparison signal $980_k$ (e.g., $V_{ck}$) based at least in part on the voltage signal 970 (e.g., $\Delta V_{FB}$) and the reference voltage $948_k$ (e.g., $V_k$). In certain examples, the comparator $940_1$ includes an input terminal $942_1$ (e.g., the "+" terminal), an input terminal $944_1$ (e.g., the "−" terminal), and an output terminal $946_1$. For example, the input terminal $942_1$ (e.g., the "+" terminal) receives the voltage signal 970 (e.g., $\Delta V_{FB}$), and the input terminal $944_1$ (e.g., the "−" terminal) receives a reference voltage $948_1$ (e.g., $V_1$). As an example, the output terminal $946_1$ outputs a comparison signal $980_1$ (e.g., $V_{c1}$) based at least in part on the voltage signal 970 (e.g., $\Delta V_{FB}$) and the reference voltage $948_1$ (e.g., $V_1$). In some examples, the comparator $940_{N-1}$ includes an input terminal $942_{N-1}$ (e.g., the "+" terminal), an input terminal $944_{N-1}$ (e.g., the "−" terminal), and an output terminal $946_{N-1}$. For example, the input terminal $942_{N-1}$ (e.g., the "+" terminal) receives the voltage signal 970 (e.g., $\Delta V_{FB}$), and the input terminal $944_{N-1}$ (e.g., the "−" terminal) receives a reference voltage $948_{N-1}$ (e.g., $V_{N-1}$). As an example, the output terminal $946_{N-1}$ outputs a comparison signal $980_{N-1}$ (e.g., $V_{c(N-1)}$) based at least in part on the voltage signal 970 (e.g., $\Delta V_{FB}$) and the reference voltage $948_{N-1}$ (e.g., $V_{N-1}$).

According to some embodiments, the control signal generator 950 receives the N−1 comparison signals that include the comparison signals $980_1, \ldots, 980_k, \ldots,$ and $980_{N-1}$, and in response generates the N control signals that include the control signals $821_1, 821_2, \ldots, 821_n, \ldots,$ and $821_N$, wherein N is an integer larger than 1, k is an integer that is larger than 0 but smaller than N, and n is an integer that is larger than 1 but smaller than or equal to N.

In certain embodiments, N is an integer equal to 2. In some examples, the (N−1) comparators include the comparator $940_1$. In some examples, the comparator $940_1$ determines compares the voltage signal 970 (e.g., $\Delta V_{FB}$) and the reference voltage $948_1$ (e.g., $V_1$). For example, if the voltage signal 970 (e.g., $\Delta V_{FB}$) is smaller than the reference voltage $948_1$ (e.g., $V_1$), the comparator $940_1$ generates the comparison signal $980_1$, which causes the control signal generator 950 to generate the control signals $921_1$ and $921_2$ to close the switch $K_1$ and open the switch $K_2$ as shown in FIG. 5 and/or FIG. 7. As an example, if the voltage signal 970 (e.g., $\Delta V_{FB}$) is larger than the reference voltage $948_1$ (e.g., $V_1$), the comparator $940_1$ generates the comparison signal $980_1$, which causes the control signal generator 950 to generate the control signals $921_1$ and $921_2$ to open the switch $K_1$ and close the switch $K_2$ as shown in FIG. 5 and/or FIG. 7. In certain examples, the resistance of the resistor $R_1$ is larger than the resistance of the resistor $R_2$.

In some embodiments, N is an integer larger than 2. For example, the reference voltage $948_{q-1}$ (e.g., $V_{q-1}$) is smaller than the reference voltage $948_q$ (e.g., $V_q$), wherein q is an integer that is larger than 1 but smaller than N. As an example, the comparator $940_{q-1}$ determines whether the voltage signal 970 (e.g., $\Delta V_{FB}$) is larger than the reference voltage $948_{q-1}$ (e.g., $V_{q-1}$), and the comparator $940_q$ determines whether the voltage signal 970 (e.g., $\Delta V_{FB}$) is smaller than the reference voltage $948_q$ (e.g., $V_q$).

In certain examples, with N being an integer larger than 2, if the comparator $940_{q-1}$ determines that the voltage signal 970 (e.g., $\Delta V_{FB}$) is larger than the reference voltage $948_{q-1}$ (e.g., $V_{q-1}$) and the comparator $940_q$ determines that the voltage signal 970 (e.g., $\Delta V_{FB}$) is smaller than the reference voltage $948_q$ (e.g., $V_q$), the comparators $940_{q-1}$ and $940_q$ generate the comparison signals $980_{j-1}$ and $980_j$ respectively, which cause the control signal generator 950 to generate the control signals $921_{q-1}$ and $921_q$ to open the switch $K_{q-1}$ and close the switch $K_q$ as shown in FIG. 5 and/or FIG. 7. For example, the resistance of the resistor $R_{q-1}$ is larger than the resistance of the resistor $R_q$. As an example, when the switch $K_q$ is closed, all other switches among the N switches, including the switch $K_{q-1}$, are open.

In some examples, with N being an integer larger than 2, if the comparator $940_1$ determines that the voltage signal 970 (e.g., $\Delta V_{FB}$) is smaller than the reference voltage $948_1$ (e.g., $V_1$), the comparator $940_1$ generates the comparison signals $980_1$, which causes the control signal generator 950 to generate the control signal $921_1$ to close the switch $K_1$ as shown in FIG. 5 and/or FIG. 7. For example, the resistance of the resistor $R_1$ is larger than the resistance of any of all other resistors among the N resistors, including the resistor $R_2$. As an example, when the switch $K_1$ is closed, all other switches among the N switches, including the switch $K_2$, are open.

In certain examples, with N being an integer larger than 2, if the comparator $940_{N-1}$ determines that the voltage signal 970 (e.g., $\Delta V_{FB}$) is larger than the reference voltage $948_{N-1}$ (e.g., $V_{N-1}$), the comparator $940_{N-1}$ generates the comparison signals $980_{N-1}$, which causes the control signal generator 950 to generate the control signal $921_N$ to close the switch $K_N$ as shown in FIG. 5 and/or FIG. 7. For example, the resistance of the resistor $R_N$ is smaller than the resistance of any of all other resistors among the N resistors. As an example, when the switch $K_N$ is closed, all other switches among the N switches, are open.

According to certain embodiments, as shown in FIG. 5, the controller 452 does not include a capacitor that is in parallel with the variable resistor network 534, wherein one terminal of the capacitor is biased at the compensation voltage 557 (e.g., $V_{comp}$) and another terminal of the capacitor is biased at the capacitor voltage 485. According to certain embodiments, as shown in FIG. 7, the controller 652 does not include a capacitor that is in parallel with the variable resistor network 734, wherein one terminal of the capacitor is biased at the voltage 779 and another terminal of the capacitor is biased to the ground voltage on the primary side of the switch-mode power converter 600.

Some embodiments of the present invention provide a switch-mode power converter that serves as a power supply to provide an output voltage that is constant in average. In certain examples, the switch-mode power converter adjusts the resistance of a variable resistor network based on a load of the switch-mode power converter (e.g., based on an output current provided by the switch-mode power converter to the load). For example, the variable resistor network is used to provide a zero to the switch-mode power converter. In some examples, the switch-mode power converter effectively improves system stability. start-up speed, and/or response speed at light load of the switch-mode power converter (e.g., when the output current provided by the switch-mode power converter to the load is at a small magnitude), but the switch-mode power converter does not adversely affect power factor and/or current distortion at full load of the switch-mode power converter (e.g., when the output current provided by the switch-mode power converter to the load is at a predetermined maximum magnitude).

According to certain embodiments, a controller for a power converter includes: a feedback detector configured to receive a feedback voltage, sample the feedback voltage, and generate a sampled voltage based at least in part on the feedback voltage, the sampled voltage being associated with one or more fluctuations in magnitude; a resistor selector configured to receive the sampled voltage and generate one or more control signals based at least in part on the one or more fluctuations associated with the sampled voltage; a variable resistor network configured to receive the one or more control signals, determine a network resistance based at least in part on the one or more control signals, and output a compensation voltage based at least in part on the network resistance; and a voltage generator connected to the variable resistor network and configured to receive the compensation voltage and generate a drive voltage based at least in part on the compensation voltage. For example, the controller is implemented according to at least FIG. 4, FIG. 5, FIG. 8, and/or FIG. 9.

As an example, the one or more control signals include a first control signal and a second control signal; and the variable resistor network includes a first resistor, a first switch, a second resistor, and a second switch; wherein: the first resistor and the first switch are connected in series; and the second resistor and the second switch are connected in series; wherein: the first control signal is configured to close the first switch and is configured to open the first switch; and the second control signal is configured to close the second switch and is configured to open the second switch. For example, the variable resistor network is further configured to: if the first switch is closed and the second switch is open, set the network resistance equal to a first resistance of the first resistor; and if the first switch is open and the second switch is closed, set the network resistance equal to a second resistance of the second resistor. As an example, the variable resistor network is connected to a capacitor including a terminal biased to a capacitor voltage; and the variable resistor network is further configured to generate the compensation voltage based at least in part on the capacitor voltage.

For example, the resistor selector is further configured to: process information associated with one or more amplitudes of the sampled voltage; and generate the one or more control signals based at least in part on the one or more amplitudes of the sampled voltage. As an example, the one or more control signals include a first control signal and a second control signal; and the variable resistor network includes a first resistor, a first switch, a second resistor, and a second switch; wherein: the first resistor and the first switch are connected in series; and the second resistor and the second switch are connected in series; wherein: the first control signal is configured to close the first switch and is configured to open the first switch; and the second control signal is configured to close the second switch and is configured to open the second switch; wherein a first resistance of the first resistor is larger than a second resistance of the second resistor. For example, the resistor selector is further configured to determine whether the one or more amplitudes of the sampled voltage associated with the one or more fluctuations are smaller than a predetermined magnitude. As an example, the resistor selector is further configured to: if the one or more amplitudes of the sampled voltage are smaller than the predetermined magnitude, generate the one or more control signals to set the network resistance equal to the first resistance of the first resistor; and if the one or more amplitudes of the sampled voltage are larger than the predetermined magnitude, generate the one or more control signals to set the network resistance equal to the second resistance of the second resistor.

According to some embodiments, a controller for a power converter includes: a feedback detector configured to receive a feedback voltage, sample the feedback voltage, and generate a sampled voltage based at least in part on the feedback voltage, the sampled voltage being associated with one or more fluctuations in magnitude; a resistor selector configured to receive the sampled voltage and generate one or more control signals based at least in part on the one or more fluctuations associated with the sampled voltage; a variable resistor network configured to receive the one or more control signals, determine a network resistance based at least in part on the one or more control signals, and output a first voltage based at least in part on the network resistance; a low-pass filter configured to receive the sampled voltage and output a second voltage based at least in part on the sampled voltage; an adder configured to receive the first voltage and the second voltage and generate a compensation voltage based at least in part on the first voltage and the second voltage; and a voltage generator connected to the adder and configured to receive the compensation voltage and generate a drive voltage based at least in part on the compensation voltage. For example, the controller is implemented according to at least FIG. 6, FIG. 7, FIG. 8, and/or FIG. 9.

As an example, the one or more control signals include a first control signal and a second control signal; and the variable resistor network includes a first resistor, a first switch, a second resistor, and a second switch; wherein: the first resistor and the first switch are connected in series; and the second resistor and the second switch are connected in series; wherein: the first control signal is configured to close the first switch and is configured to open the first switch; and the second control signal is configured to close the second switch and is configured to open the second switch. For example, the variable resistor network is further configured to: if the first switch is closed and the second switch is open, set the network resistance equal to a first resistance of the first resistor; and if the first switch is open and the second switch is closed, set the network resistance equal to a second resistance of the second resistor. As an example, the first resistor and the first switch are connected in series with one end biased to a predetermined voltage and the other end biased to the first voltage; and the second resistor and the second switch are connected in series with one end biased to the predetermined voltage and the other end biased to the first voltage.

For example, the resistor selector is further configured to: process information associated with one or more amplitudes of the sampled voltage; and generate the one or more control signals based at least in part on the one or more amplitudes of the sampled voltage. As an example, the one or more control signals include a first control signal and a second control signal; and the variable resistor network includes a first resistor, a first switch, a second resistor, and a second switch; wherein: the first resistor and the first switch are connected in series; and the second resistor and the second switch are connected in series; wherein: the first control signal is configured to close the first switch and is configured to open the first switch; and the second control signal is configured to close the second switch and is configured to open the second switch; wherein a first resistance of the first resistor is larger than a second resistance of the second resistor. For example, the resistor selector is further configured to determine whether the one or more amplitudes of the sampled voltage associated with the one or more fluctuations are smaller than a predetermined magnitude. As an example, the resistor selector is further configured to: if the one or more amplitudes of the sampled voltage are smaller than the predetermined magnitude, generate the one or more control signals to set the network resistance equal to the first resistance of the first resistor; and if the one or more amplitudes of the sampled voltage are larger than the predetermined magnitude, generate the one or more control signals to set the network resistance equal to the second resistance of the second resistor. For example, the adder is further configured to generate the compensation voltage equal to a sum of the first voltage and the second voltage.

According to certain embodiments, a method for a power converter includes: receiving a feedback voltage; sampling the feedback voltage; generating a sampled voltage based at least in part on the feedback voltage, the sampled voltage being associated with one or more fluctuations in magnitude; receiving the sampled voltage; generating one or more control signals based at least in part on the one or more fluctuations associated with the sampled voltage; receiving the one or more control signals; determining a network resistance based at least in part on the one or more control signals; outputting a compensation voltage based at least in part on the network resistance; receiving the compensation voltage; and generating a drive voltage based at least in part on the compensation voltage. For example, the method is implemented according to at least FIG. 4, FIG. 5, FIG. 8, and/or FIG. 9.

As an example, the generating one or more control signals based at least in part on the one or more fluctuations associated with the sampled voltage includes: processing information associated with one or more amplitudes of the sampled voltage; and generating the one or more control signals based at least in part on the one or more amplitudes of the sampled voltage. For example, the processing information associated with one or more amplitudes of the sampled voltage includes: determining whether the one or more amplitudes of the sampled voltage are smaller than a predetermined magnitude. As an example, the generating the one or more control signals based at least in part on the one or more amplitudes of the sampled voltage includes: if the one or more amplitudes of the sampled voltage are smaller than the predetermined magnitude, generating the one or more control signals to set the network resistance equal to a first resistance; and if the one or more amplitudes of the sampled voltage are larger than the predetermined magnitude, generating the one or more control signals to set the network resistance equal to a second resistance; wherein the first resistance is larger than the second resistance.

According to some embodiments, a method for a power converter includes: receiving a feedback voltage; sampling the feedback voltage; generating a sampled voltage based at least in part on the feedback voltage, the sampled voltage being associated with one or more fluctuations in magnitude; receiving the sampled voltage; generating one or more control signals based at least in part on the one or more fluctuations associated with the sampled voltage; receiving the one or more control signals; determining a network resistance based at least in part on the one or more control signals; outputting a first voltage based at least in part on the network resistance; outputting a second voltage based at least in part on the sampled voltage; receiving the first voltage and the second voltage; generating a compensation voltage based at least in part on the first voltage and the second voltage; receiving the compensation voltage; and generating a drive voltage based at least in part on the compensation voltage. For example, the method is implemented according to at least FIG. 6, FIG. 7, FIG. 8, and/or FIG. 9.

As an example, the generating one or more control signals based at least in part on the one or more fluctuations associated with the sampled voltage includes: processing information associated with one or more amplitudes of the sampled voltage; and generating the one or more control signals based at least in part on the one or more amplitudes of the sampled voltage. For example, the processing information associated with one or more amplitudes of the sampled voltage includes: determining whether the one or more amplitudes of the sampled voltage associated with the one or more fluctuations are smaller than a predetermined magnitude. As an example, the generating the one or more control signals based at least in part on the one or more amplitudes of the sampled voltage includes: if the one or more amplitudes of the sampled voltage are smaller than the predetermined magnitude, generating the one or more control signals to set the network resistance equal to a first resistance; and if the one or more amplitudes of the sampled voltage are larger than the predetermined magnitude, generating the one or more control signals to set the network resistance equal to a second resistance; wherein the first resistance is larger than the second resistance. For example, the generating a compensation voltage based at least in part on the first voltage and the second voltage includes: generating the compensation voltage equal to a sum of the first voltage and the second voltage.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:
   a resistor selector configured to receive a sampled voltage and generate one or more control signals based at least in part on one or more fluctuations associated with the sampled voltage; and
   a variable resistor network configured to receive the one or more control signals, determine a network resistance based at least in part on the one or more control signals, and output a compensation voltage based at least in part on the network resistance.

2. The controller of claim 1 wherein:
   the one or more control signals include a first control signal and a second control signal; and
   the variable resistor network includes a first resistor, a first switch, a second resistor, and a second switch;
   wherein:
      the first resistor and the first switch are connected in series; and
      the second resistor and the second switch are connected in series;
   wherein:
      the first control signal is configured to close the first switch and is configured to open the first switch; and
      the second control signal is configured to close the second switch and is configured to open the second switch.

3. The controller of claim 2 wherein the variable resistor network is further configured to:
   if the first switch is closed and the second switch is open, set the network resistance equal to a first resistance of the first resistor; and
   if the first switch is open and the second switch is closed, set the network resistance equal to a second resistance of the second resistor.

4. The controller of claim 1 wherein:
   the variable resistor network is connected to a capacitor including a terminal biased to a capacitor voltage; and
   the variable resistor network is further configured to generate the compensation voltage based at least in part on the capacitor voltage.

5. The controller of claim 1 wherein the resistor selector is further configured to:
   process information associated with one or more amplitudes of the sampled voltage; and
   generate the one or more control signals based at least in part on the one or more amplitudes of the sampled voltage.

6. The controller of claim 5 wherein:
   the one or more control signals include a first control signal and a second control signal; and
   the variable resistor network includes a first resistor, a first switch, a second resistor, and a second switch;
   wherein:
      the first resistor and the first switch are connected in series; and
      the second resistor and the second switch are connected in series;
   wherein:
      the first control signal is configured to close the first switch and is configured to open the first switch; and
      the second control signal is configured to close the second switch and is configured to open the second switch;
   wherein a first resistance of the first resistor is larger than a second resistance of the second resistor.

7. The controller of claim 6 wherein the resistor selector is further configured to determine whether the one or more amplitudes of the sampled voltage associated with the one or more fluctuations are smaller than a predetermined magnitude.

8. The controller of claim 7 wherein the resistor selector is further configured to:
   if the one or more amplitudes of the sampled voltage are smaller than the predetermined magnitude, generate the one or more control signals to set the network resistance equal to the first resistance of the first resistor; and if the one or more amplitudes of the sampled voltage are larger than the predetermined magnitude, generate the one or more control signals to set the network resistance equal to the second resistance of the second resistor.

9. A controller for a power converter, the controller comprising:
a resistor selector configured to receive a sampled voltage and generate one or more control signals based at least in part on one or more fluctuations associated with the sampled voltage; and
a variable resistor network configured to receive the one or more control signals, determine a network resistance based at least in part on the one or more control signals, and output a first voltage based at least in part on the network resistance.

10. The controller of claim 9 wherein:
the one or more control signals include a first control signal and a second control signal; and
the variable resistor network includes a first resistor, a first switch, a second resistor, and a second switch;
wherein:
the first resistor and the first switch are connected in series; and
the second resistor and the second switch are connected in series;
wherein:
the first control signal is configured to close the first switch and is configured to open the first switch; and
the second control signal is configured to close the second switch and is configured to open the second switch.

11. The controller of claim 10 wherein the variable resistor network is further configured to:
if the first switch is closed and the second switch is open, set the network resistance equal to a first resistance of the first resistor; and
if the first switch is open and the second switch is closed, set the network resistance equal to a second resistance of the second resistor.

12. The controller of claim 10 wherein:
the first resistor and the first switch are connected in series with one end biased to a predetermined voltage and the other end biased to the first voltage; and
the second resistor and the second switch are connected in series with one end biased to the predetermined voltage and the other end biased to the first voltage.

13. The controller of claim 9 wherein the resistor selector is further configured to:
process information associated with one or more amplitudes of the sampled voltage; and
generate the one or more control signals based at least in part on the one or more amplitudes of the sampled voltage.

14. The controller of claim 13 wherein:
the one or more control signals include a first control signal and a second control signal; and
the variable resistor network includes a first resistor, a first switch, a second resistor, and a second switch;
wherein:
the first resistor and the first switch are connected in series; and
the second resistor and the second switch are connected in series;

wherein:
the first control signal is configured to close the first switch and is configured to open the first switch; and
the second control signal is configured to close the second switch and is configured to open the second switch;
wherein a first resistance of the first resistor is larger than a second resistance of the second resistor.

15. The controller of claim 14 wherein the resistor selector is further configured to determine whether the one or more amplitudes of the sampled voltage associated with the one or more fluctuations are smaller than a predetermined magnitude.

16. The controller of claim 15 wherein the resistor selector is further configured to:
if the one or more amplitudes of the sampled voltage are smaller than the predetermined magnitude, generate the one or more control signals to set the network resistance equal to the first resistance of the first resistor; and
if the one or more amplitudes of the sampled voltage are larger than the predetermined magnitude, generate the one or more control signals to set the network resistance equal to the second resistance of the second resistor.

17. The controller of claim 9 further comprising an adder configured to receive the first voltage and a second voltage and generate a compensation voltage equal to a sum of the first voltage and the second voltage.

18. A method for a power converter, the method comprising:
generating one or more control signals based at least in part on one or more fluctuations associated with a sampled voltage;
receiving one or more control signals;
determining a network resistance based at least in part on one or more control signals; and
outputting a compensation voltage based at least in part on the network resistance.

19. The method of claim 18 wherein the generating one or more control signals based at least in part on one or more fluctuations associated with a sampled voltage includes:
processing information associated with one or more amplitudes of the sampled voltage; and
generating the one or more control signals based at least in part on the one or more amplitudes of the sampled voltage.

20. The method of claim 19 wherein the processing information associated with one or more amplitudes of the sampled voltage includes:
determining whether the one or more amplitudes of the sampled voltage are smaller than a predetermined magnitude.

21. The method of claim 20 wherein the generating the one or more control signals based at least in part on the one or more amplitudes of the sampled voltage includes:
if the one or more amplitudes of the sampled voltage are smaller than the predetermined magnitude, generating the one or more control signals to set the network resistance equal to a first resistance; and
if the one or more amplitudes of the sampled voltage are larger than the predetermined magnitude, generating the one or more control signals to set the network resistance equal to a second resistance;
wherein the first resistance is larger than the second resistance.

22. A method for a power converter, the method comprising:
- determining a network resistance based at least in part on one or more control signals;
- outputting a first voltage based at least in part on the network resistance;
- outputting a second voltage based at least in part on a sampled voltage; and
- receiving the first voltage and the second voltage.

23. The method of claim 22, and further comprising:
- generating one or more control signals based at least in part on one or more fluctuations associated with the sampled voltage;
- wherein generating one or more control signals based at least in part on one or more fluctuations associated with the sampled voltage includes:
- processing information associated with one or more amplitudes of the sampled voltage; and
- generating the one or more control signals based at least in part on the one or more amplitudes of the sampled voltage.

24. The method of claim 23 wherein the processing information associated with one or more amplitudes of the sampled voltage includes:
- determining whether the one or more amplitudes of the sampled voltage associated with the one or more fluctuations are smaller than a predetermined magnitude.

25. The method of claim 24 wherein the generating the one or more control signals based at least in part on the one or more amplitudes of the sampled voltage includes:
- if the one or more amplitudes of the sampled voltage are smaller than the predetermined magnitude, generating the one or more control signals to set the network resistance equal to a first resistance; and
- if the one or more amplitudes of the sampled voltage are larger than the predetermined magnitude, generating the one or more control signals to set the network resistance equal to a second resistance;
- wherein the first resistance is larger than the second resistance.

26. The method of claim 22 and further comprising:
- generating a compensation voltage equal to a sum of the first voltage and the second voltage.

* * * * *